US012628159B2

(12) United States Patent
Guo et al.

(10) Patent No.: US 12,628,159 B2
(45) Date of Patent: May 12, 2026

(54) UPLINK TRANSMISSION REPETITION WITH MULTIPLE TRANSPORT BLOCKS

(71) Applicant: QUALCOMM Incorporated, San Diego, CA (US)

(72) Inventors: Shaozhen Guo, Beijing (CN); Changlong Xu, Beijing (CN); Jing Sun, San Diego, CA (US); Xiaoxia Zhang, San Diego, CA (US); Hao Xu, Beijing (CN); Rajat Prakash, San Diego, CA (US); Luanxia Yang, Beijing (CN); Siyi Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 18/263,589

(22) PCT Filed: Apr. 2, 2021

(86) PCT No.: PCT/CN2021/085301
§ 371 (c)(1),
(2) Date: Jul. 31, 2023

(87) PCT Pub. No.: WO2022/205424
PCT Pub. Date: Oct. 6, 2022

(65) Prior Publication Data
US 2024/0314771 A1 Sep. 19, 2024

(51) Int. Cl.
*H04L 5/00* (2006.01)
*H04L 1/1812* (2023.01)
(Continued)

(52) U.S. Cl.
CPC ....... *H04W 72/1268* (2013.01); *H04L 1/1812* (2013.01); *H04W 16/14* (2013.01); *H04W 72/21* (2023.01)

(58) Field of Classification Search
None
See application file for complete search history.

(56) References Cited

U.S. PATENT DOCUMENTS

2021/0144743 A1* 5/2021 Rastegardoost ...... H04W 72/23
2022/0038211 A1* 2/2022 Talarico ................. H04L 1/189
(Continued)

FOREIGN PATENT DOCUMENTS

WO 2020032637 A1 2/2020
WO 2020146672 A1 7/2020

OTHER PUBLICATIONS

Intel Corporation: "Enhancements to Configured Grants for NR-Unlicensed", 3GPP TSG RAN WG1 Meeting #98bis, R1-1910643, Chongqing, China, Oct. 14, 2019-Oct. 20, 2019, pp. 1-14, Oct. 20, 2019 (Oct. 20, 2019) the whole document.
(Continued)

*Primary Examiner* — Sithu Ko
(74) *Attorney, Agent, or Firm* — QUALCOMM Incorporated

(57) ABSTRACT

Mechanisms for transmitting a plurality of uplink (UL) transmission block (TB) repetitions associated with a plurality of TBs in a configured grant (CG) resource are provided. In one aspect, a method for multi-TB PUSCH repetition performed by a CE includes determining, based on a first parameter and a second parameter, a number of transport blocks (TBS) for a multi-TB repetition uplink (UL) communication in a configured grant (CG) resource, where the first parameter indicates a first number of TB repetitions, and where the second parameter indicates a second number of TB repetitions. The method further includes transmitting, to a base station (BS) using the CG resource in an unlicensed band, a plurality of TB repetitions based on the determined number of TBs.

40 Claims, 15 Drawing Sheets

(51) Int. Cl.
    *H04W 16/14*         (2009.01)
    *H04W 72/1268*     (2023.01)
    *H04W 72/21*        (2023.01)

(56) References Cited

U.S. PATENT DOCUMENTS

| | | | | |
|---|---|---|---|---|
| 2022/0159682 A1* | 5/2022 | Liu | ............................ | H04L 1/08 |
| 2022/0183033 A1* | 6/2022 | Huang | .................. | H04L 5/0014 |
| 2022/0231789 A1* | 7/2022 | Ying | ...................... | H04L 1/189 |
| 2022/0322409 A1* | 10/2022 | Yokomakura | ......... | H04L 5/0048 |
| 2023/0029850 A1* | 2/2023 | Park | ...................... | H04L 1/1861 |
| 2023/0232380 A1* | 7/2023 | Bhamri | ..................... | H04L 1/08 |
| | | | | 370/329 |

OTHER PUBLICATIONS

International Search Report and Written Opinion—PCT/CN2021/085301—ISA/EPO—Jan. 4, 2022.

Moderator (Nokia et al.,): "FL Summary of TB Processing Over Multi-Slot PUSCH (AI 8.8.1.2)", 3GPP TSG RAN WG1 #104-e, R1-2102241, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Feb. 8, 2021, XP051977803, 79 Pages, Sect. 2.2.1, Ericsson Contribution.

TCL: "Enhancements for Unlicensed Band URLLC/IIoT", 3GPP Draft, 3GPP TSG RAN WG1 #104-e, R1-2100543, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021 (Jan. 18, 2021), XP051970434, 7 Pages, Feb. 5, 2021 (Feb. 5, 2021).

Supplementary European Search Report—EP21934081—Search Authority—The Hague—Nov. 29, 2024.

TCL: "Enhancements for Unlicensed Band URLLC/IIoT", 3GPP TSG RAN WG1 #102-e, R1-2005768, 3rd Generation Partnership Project (3GPP), Mobile Competence Centre, 650, Route Des Lucioles, F-06921 Sophia-Antipolis Cedex, France, vol. RAN WG1, No. e-Meeting; Aug. 17, 2020-Aug. 28, 2020, Aug. 7, 2020, 7 Pages, XP052347141, p. 5, section 4, par. 1, p. 5, last two par, p. 6, Table 1.

* cited by examiner

Parameters:

K = 7
repK = 2
Starting symbol = 2
L (symbols/TB rep) = 3
N = floor(K/repK) = 3

Parameters:
K = 7
repK = 2
Starting symbol = 2
L (symbols/TB rep) = 3
N = cieling(K/repK) = 4

300b

Figure 10:
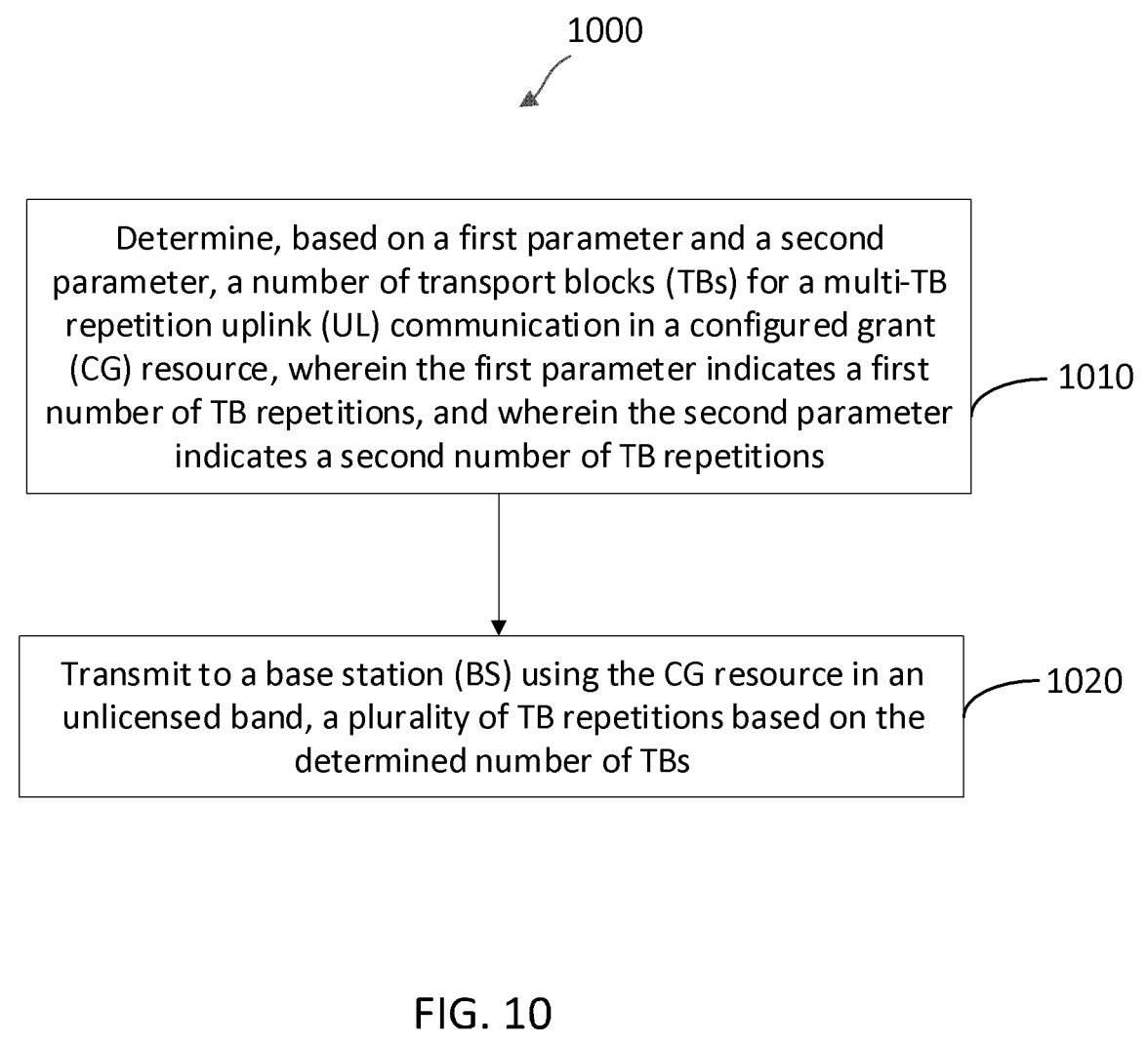

1000

Determine, based on a first parameter and a second parameter, a number of transport blocks (TBs) for a multi-TB repetition uplink (UL) communication in a configured grant (CG) resource, wherein the first parameter indicates a first number of TB repetitions, and wherein the second parameter indicates a second number of TB repetitions — 1010

Transmit to a base station (BS) using the CG resource in an unlicensed band, a plurality of TB repetitions based on the determined number of TBs — 1020

Transmit, to a base station (BS) in a configured grant (CG) resource, a plurality of transport block (TB) repetitions associated with a plurality of TBs — 1110

Receive, in a physical downlink control channel (PDCCH), a retransmission request indicating one or more TBs associated with the plurality of TB repetitions for retransmission — 1120

Transmit, to the BS, the one or more TBs — 1130

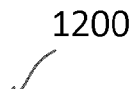

1200

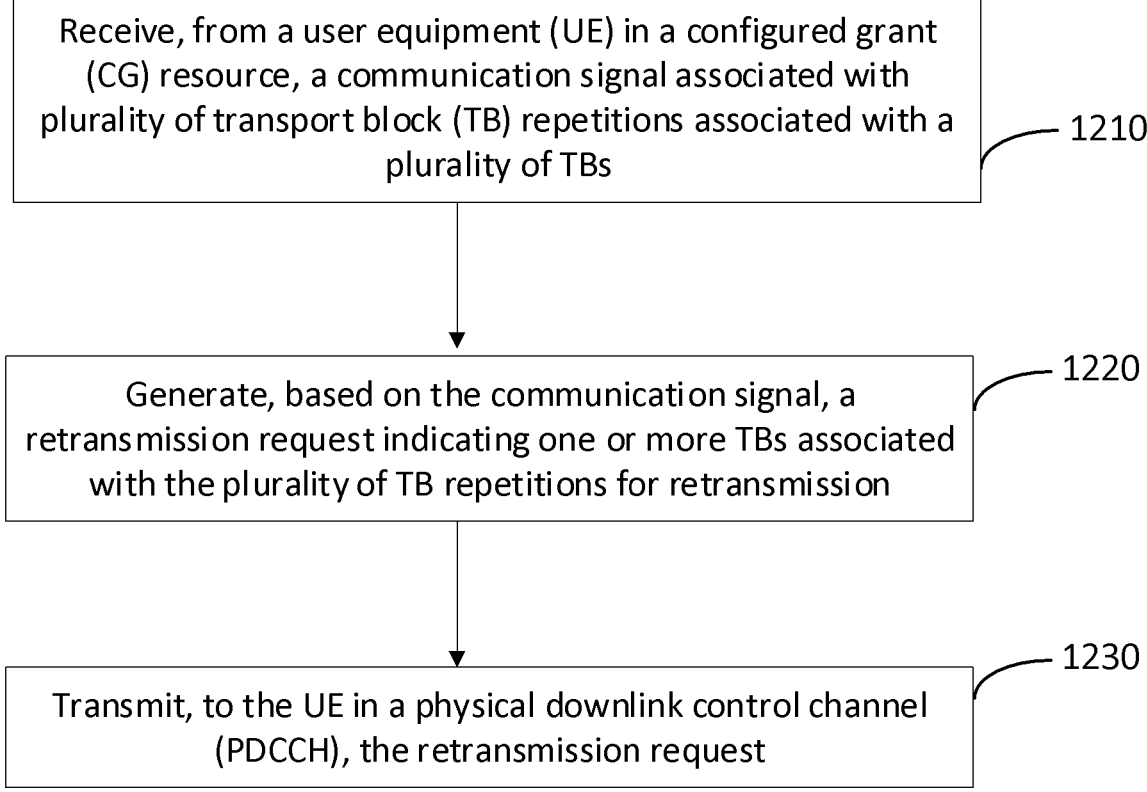

Receive, from a user equipment (UE) in a configured grant (CG) resource, a communication signal associated with plurality of transport block (TB) repetitions associated with a plurality of TBs    — 1210

Generate, based on the communication signal, a retransmission request indicating one or more TBs associated with the plurality of TB repetitions for retransmission    — 1220

Transmit, to the UE in a physical downlink control channel (PDCCH), the retransmission request    — 1230

FIG. 12

UPLINK TRANSMISSION REPETITION WITH MULTIPLE TRANSPORT BLOCKS

CROSS-REFERENCE TO RELATED APPLICATIONS

The present application is a 35 U.S.C. 371 National Phase entry of Patent Cooperation Treaty (PCT) Application No. PCT/CN2021/085301, filed Apr. 2, 2021, which is hereby expressly incorporated herein by reference in its entirety.

TECHNICAL FIELD

The present disclosure is directed to wireless communication systems and methods, and in particular to systems and methods for uplink transmission repetition with multiple transport blocks.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mm Wave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to providing a high-reliability communication is to use transport block (TB) repetition to transmit an uplink (UL) payload, which may also be referred to as a TB, multiple times. This may increase the chances that the BS successfully receives and/or decodes the payload. To further improve communication reliability, hybrid automatic repeat request (HARQ) techniques can be applied to TB repetition transmission whereby the BS schedules the UE with a retransmission of one or more TBs.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure describes mechanisms for transmitting a plurality of uplink (UL) transmission blocks (TB) repetitions associated with a plurality of TBs in a configured grant (CG) resource. For example, a method for multi-TB repetition may include determining, based on one or more CG configuration parameters, a number of TBs for an UL communication, and transmitting a plurality of TB repetitions based on the determined number of TBs to a base station (BS) in a CG resource. In some aspects, the parameters may include a total number of TB repetitions, a length of each TB repetition (e.g., in symbols), a starting symbol of the first TB repetition, or any other suitable parameter. The mechanisms described herein may also include techniques for determining or indicating a hybrid automatic repeat request (HARQ) process identifier (ID) for each TB, and techniques for requesting and/or performing retransmissions of one or more TBs based on the determined HARQ process IDs.

One aspect of the present disclosure includes a method for wireless communication using a user equipment (UE). The method includes determining, based on a first parameter and a second parameter, a number of transport blocks (TBS) for a multi-TB repetition uplink (UL) communication in a configured grant (CG) resource, where the first parameter indicates a first number of TB repetitions, and where the second parameter indicates a second number of TB repetitions. The method also includes transmitting, to a base station (BS) using the CG resource in an unlicensed band, a plurality of TB repetitions based on the determined number of TBs.

One aspect of the present disclosure includes a method for wireless communication using a user equipment (UE). The method includes transmitting, to a base station (BS) in a configured grant (CG) resource, a plurality of transport block (TB) repetitions associated with a plurality of TBs. The method also includes receiving, in a physical downlink control channel (PDCCH), a retransmission request indicating one or more TBs associated with the plurality of TB repetitions for retransmission; and transmitting, to the BS, the one or more TBs.

One aspect of the present disclosure includes a method for wireless communication using a base station (BS). The method includes receiving, from a user equipment (UE) in a configured grant (CG) resource, a communication signal associated with plurality of transport block (TB) repetitions associated with a plurality of TBs. The method also includes generating, based on the communication signal, a retransmission request indicating one or more TBs associated with the plurality of TB repetitions for retransmission; and transmitting, to the UE in a physical downlink control channel (PDCCH), the retransmission request.

One aspect of the present disclosure includes a user equipment (UE) including a processor configured to determine, based on a first parameter and a second parameter, a number of transport blocks (TBS) for a multi-TB repetition uplink (UL) communication in a configured grant (CG) resource, where the first parameter indicates a first number of TB repetitions, and where the second parameter indicates a second number of TB repetitions. The UE further includes a transceiver coupled with the processor and configured to transmit, to a base station (BS) using the CG resource in an unlicensed band, a plurality of TB repetitions based on the determined number of TBs.

One aspect of the present disclosure includes a user equipment (UE) including a transceiver configured to transmit, to a base station (BS) in a configured grant (CG) resource, a plurality of transport block (TB) repetitions associated with a plurality of TBs. The transceiver is further configured to receive, in a physical downlink control channel (PDCCH), a retransmission request indicating one or more TBs associated with the plurality of TB repetitions for retransmission; and transmit, to the BS, the one or more TBs.

One aspect of the present disclosure includes a base station (BS) including a transceiver configured to receive, from a user equipment (UE) in a configured grant (CG) resource, a communication signal associated with plurality of transport block (TB) repetitions associated with a plurality of TBs. The BS further includes a processor configured to generate, based on the communication signal, a retransmission request indicating one or more TBs associated with the plurality of TB repetitions for retransmission, where the transceiver is further configured to transmit, to the UE in a physical downlink control channel (PDCCH), the retransmission request.

One aspect of the present disclosure includes a non-transitory computer readable medium having program code recorded thereon. The program code includes code for causing a user equipment (UE) to determine, based on a first parameter and a second parameter, a number of transport blocks (TBS) for a multi-TB repetition uplink (UL) communication in a configured grant (CG) resource, where the first parameter indicates a first number of TB repetitions, and where the second parameter indicates a second number of TB repetitions. The program code also includes code for causing the UE to transmit, to a base station (BS) using the CG resource in an unlicensed band, a plurality of TB repetitions based on the determined number of TBs.

One aspect of the present disclosure includes a non-transitory computer-readable medium having program code recorded thereon. The program code includes code for causing a user equipment (UE) to transmit, to a base station (BS) in a configured grant (CG) resource, a plurality of transport block (TB) repetitions associated with a plurality of TBs. The program code also includes code for causing the UE to receive, in a physical downlink control channel (PDCCH), a retransmission request indicating one or more TBs associated with the plurality of TB repetitions for retransmission. The program code also includes code for causing the UE to transmit, to the BS, the one or more TBs.

One aspect of the present disclosure includes a non-transitory computer-readable medium having program code recorded thereon. The program code includes code for causing a base station (BS) to receive, from a user equipment (UE) in a configured grant (CG) resource, a communication signal associated with plurality of transport block (TB) repetitions associated with a plurality of TBs. The program code also includes code for causing the BS to generate, based on the communication signal, a retransmission request indicating one or more TBs associated with the plurality of TB repetitions for retransmission. The program code also includes code for causing the BS to transmit, to the UE in a physical downlink control channel (PDCCH), the retransmission request.

One aspect of the present disclosure includes a user equipment (UE). The UE includes means for determining, based on a first parameter and a second parameter, a number of transport blocks (TBS) for a multi-TB repetition uplink (UL) communication in a configured grant (CG) resource, where the first parameter indicates a first number of TB repetitions, and where the second parameter indicates a second number of TB repetitions. The UE also includes means for transmitting, to a base station (BS) using the CG resource in an unlicensed band, a plurality of TB repetitions based on the determined number of TBs.

One aspect of the present disclosure includes a user equipment (UE). The UE includes means for transmitting, to a base station (BS) in a configured grant (CG) resource, a plurality of transport block (TB) repetitions associated with a plurality of TBs; means for receiving, in a physical downlink control channel (PDCCH), a retransmission request indicating one or more TBs associated with the plurality of TB repetitions for retransmission; and means for transmitting, to the BS, the one or more TBs.

One aspect of the present disclosure includes a base station (BS). The BS includes means for receiving, from a user equipment (UE) in a configured grant (CG) resource, a communication signal associated with plurality of transport block (TB) repetitions associated with a plurality of TBs; means for generating, based on the communication signal, a retransmission request indicating one or more TBs associated with the plurality of TB repetitions for retransmission; and means for transmitting, to the UE in a physical downlink control channel (PDCCH), the retransmission request.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 10 is a flow diagram of a communication method according to some aspects of the present disclosure.

FIG. 12 is a flow diagram of a communication method according to some aspects of the present disclosure.

DETAILED DESCRIPTION

Figure 1:
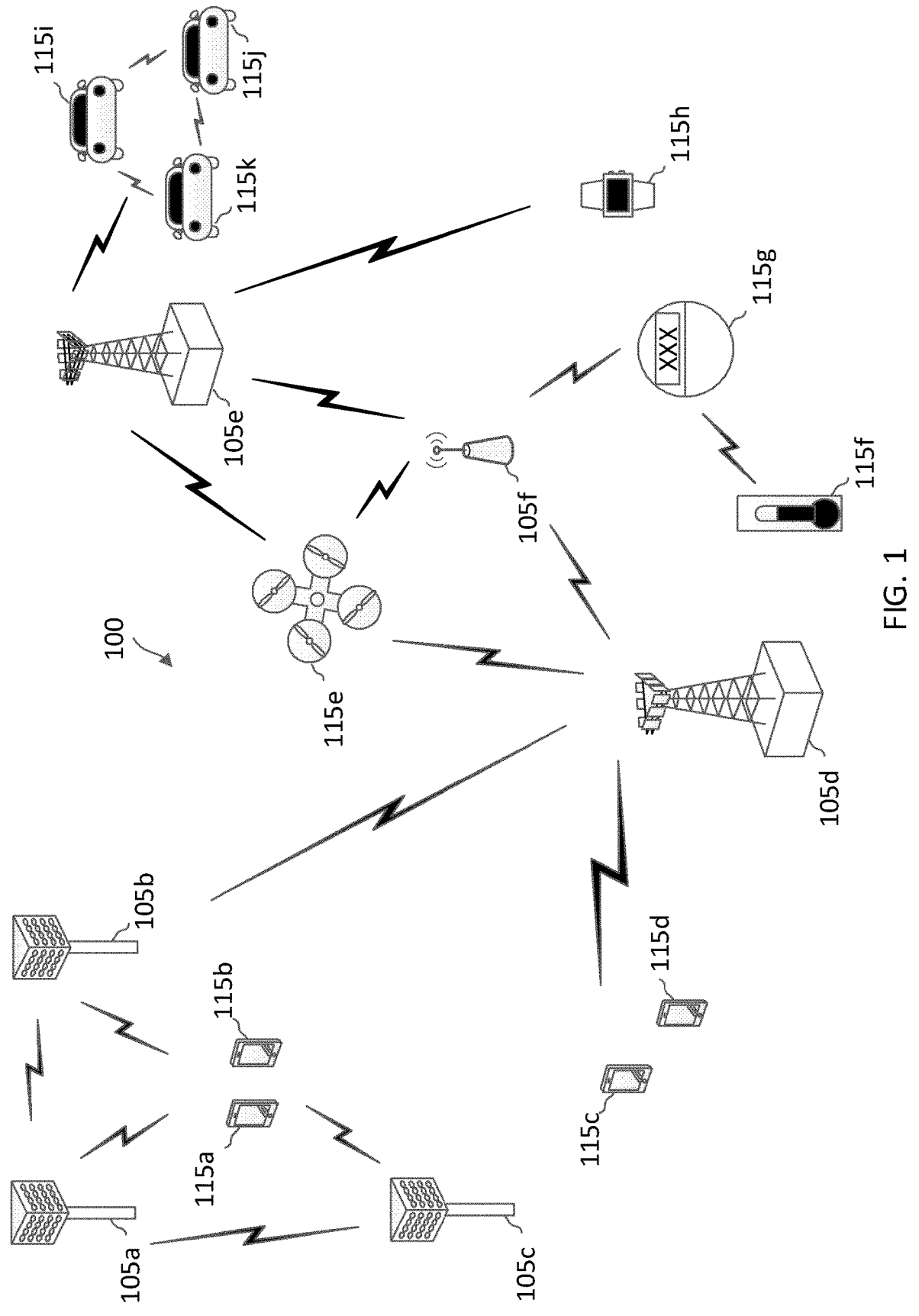
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive internet of things (IoTs) with a ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a base station (BS) may configure a user equipment (UE) with a configured grant for autonomous transmission or non-scheduled transmission. Each configured grant is associated with a set of resources configured for the UE to transmit UL communications (e.g., data and/or control information) without being scheduled by the BS. The set of configured resource may occur periodically. The set of configured resources are time-frequency resources, where each configured resource may occupy one or more symbols in time and one or more subcarriers in frequency. The time locations of the set of configured resources may be referred to transmission time occasions. In some instances, the UE may use the configured resources for transmitting a transport block (TB) on a physical uplink shared channel (PUSCH). To improve communication reliability, the UE may apply hybrid automatic repeat request (HARQ) techniques to the UL data transmission. Additionally, the UE may perform the UL data transmission with repetitions using different redundancy versions to improve decoding performance at the BS. When operating over a licensed band, the BS may assign a HARQ process and/or a HARQ redundancy version for transmission in each transmission time occasion. In other words, the BS may provide a mapping or association between HARQ process/redundancy version to configured resource in the time domain. The UE may transmit UL HARQ data in the configured transmission occasions based on the association.

A UE may be configured with PUSCH repetition type-A or PUSCH repetition type-B. In PUSCH repetition type-A, the UE is configured to transmit a single PUSCH repetition, which may be referred to as a TB repetition herein, per slot. Because of the time gap between TB repetitions, PUSCH type A may increase the latency in communications between the UE and the BS. Type-B PUSCH repetition reduces the latency by allowing for multiple TB repetitions within a single slot. As such, Type-B PUSCH repetition may be suitable for ultra-reliable, low-latency communication (URLLC) applications. In PUSCH repetition type-B, a time domain resource assignment (TDRA) field may be provided in a DCI or in a CG configuration, which identifies the time/frequency resources for a first TB repetition. In some aspects, present PUSCH repetition configurations may be less suitable for communications in shared or unlicensed frequency bands. For instance, the present PUSCH repetition configurations may not consider transmission of multiple TB repetitions within a slot, such as PUSCH repetition type-B, using CG resources. Accordingly, there is a need to improve CG transmission configuration for PUSCH repetition type-B over an unlicensed band.

The present application describes mechanisms for performing multi-TB repetition UL communications in unlicensed bands using CG resources. For example, a wireless communication device, such as a UE, may be configured by a BS to transmit multi-TB repetition UL communications in unlicensed bands using CG resources. The UE may determine, based on one or more CG configuration parameters, a number of TBs for a multi-TB repetition UL communication, and transmitting a plurality of TB repetitions based on the determined number of TBs to a base station (BS) in a CG resource. A multi-TB repetition UL communication may refer to a UL transmission including multiple different TBs (e.g., different information data or data packets) with one or more of the TBs being transmitted twice. That is, the UL transmission may include at least a first TB of the multiple different TBs with two or more repetitions. Each repetition may refer to one instance of a TB. In some aspects, the parameters may include a total number of TB repetitions (in the multi-TB repetition UL communication), a number nominal repetitions, a length of each TB repetition (e.g., in symbols), a starting symbol of the first TB repetition, or any other suitable parameter. In some aspects, the total number of TB repetitions may be referred to as a first parameter and the number of nominal repetitions may be referred to as a second parameter. The number of nominal repetitions is a number of repetitions signaled by the BS and in some instances, a UE can transmit a different number of actual repetitions as will be discussed more fully below. In one aspect, the UE may apply a floor operation to a ratio of the first parameter to the second parameter to determine the number of TBs to be transmitted in the multi-TB repetition UL communication. In another aspect, the UE may apply a ceiling operation to a ratio of the first parameter to the second parameter to determine the number of TBs to be transmitted in the multi-TB repetition UL communication. The mechanisms described herein may also include techniques for determining or indicating a hybrid automatic repeat request (HARQ) process identifier (ID) for each TB, and techniques for requesting and/or performing retransmissions of one or more TBs based on the determined HARQ process IDs. For example, a UE may indicate a HARQ process ID for each TB in a configured grant uplink control information (CG-UCI). The UE may transmit one CG-UCI for each nominal TB repetition, or for each actual TB repetition. In other aspects, the UE and/or the BS may determine a HARQ process ID for each TB based on a predefined rule or formula. The formula may include one or more parameters associated with a multi-TB repetition configuration. In some aspects, if the BS fails to decode a TB, the BS may transmit, to the UE, a retransmission request indicating the TB or TBs for retransmission. The retransmission request may include a bitmap and/or a HARQ process ID field indicating which TBs the UE is to retransmit. In some aspects, the BS may generate a DCI including a bitmap and an indication of a HARQ process ID associated with a first bit in the bitmap, where each bit of the bitmap indicates whether retransmission is requested for a corresponding TB index. In other aspects, the BS may generate a downlink control information (DCI) including a bitmap and an indication of a first HARQ process ID associated with a first bit in the bitmap, where each bit of the bitmap indicates whether retransmission is requested for a corresponding HARQ process ID according to a scheduled order beginning with the first HARQ process ID The mechanisms, devices, systems, and methods described herein provide several benefits and enhancements, including improved transmission-latency, improved HARQ process signaling, and improved resource utilization efficiency. In some aspects, the methods for multi-TB repetitions for CG UL communications allow a UE more flexibility to prioritize data throughput, transmission latency and/or reliability. The improved transmission latency and/or reliability may better support URLLC communications.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI).

The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

In some aspects, the network 100 may provide to a UE 115 (or 300) a configured grant resource. Via network 100, BS 105 (or 400) may communicate with UE 115 to indicate a number of HARQ processes for a configured grant resource. BS 105 may also communicate to the UE parameters regarding the configured grant resource, such as the number of PUSCHs per slot and the number of slots in a configured grant resource period. The UE 115 may communicate with BS 105 TBs associated with HARQ processes via network 100. Network 100, BS 105, and/or UE 115 may determine a starting HARQ process ID and HARQ process IDs for each of HARQ processes associated with configured grant PUSCHs, where the BS 105 and UE 115 may communicate TBs for a subset of the available HARQ processes or all HARQ processes in the CG resource.

Figure 2A:
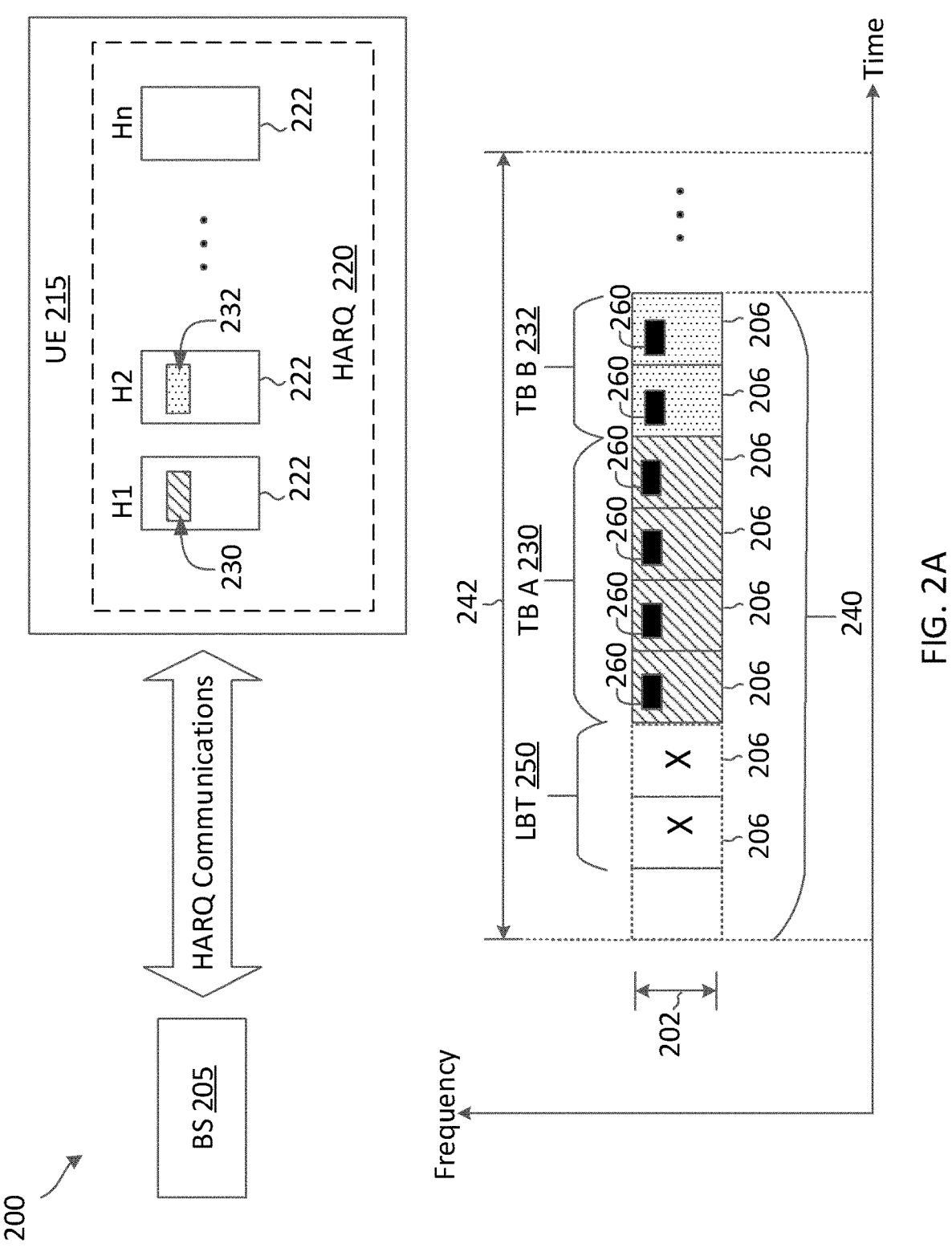
FIG. 2A illustrates a hybrid automatic repeat request (HARQ) communication scenario according to some aspects of the present disclosure.

FIG. 2A illustrates a hybrid automatic repeat request (HARQ) communication scenario according to some aspects of the present disclosure. The scenario 200 may correspond to a HARQ communication scenario in the network 100 when the network 100 operates over a shared frequency band or an unlicensed frequency band. In FIG. 2A, the x-axis represents time in some constant units. In the scenario 200, a BS 205 similar to the BSs 105 may communicate data with a UE 215 similar to the UEs 115 using HARQ over a frequency band 202, which may be a licensed frequency band or a shared radio frequency band in a shared spectrum or an unlicensed spectrum, shared by multiple network operating entities. The frequency band 202 may be located at any suitable frequencies. In some aspects, the frequency band 202 may be located at about 3.5 GHz, 6 GHz, or 30 GHz.

For HARQ communications, a transmitting node (e.g., the UE 215) may transmit data (e.g., in the form of a TB) to a receiving node (e.g., the BS 205). The receiving node may provide the transmitting node with a feedback on the reception status of the data. For example, the receiving node may transmit an ACK to the transmitting node to indicate a successful decoding of the data. Conversely, the receiving node may transmit a NACK to the transmitting node to indicate a decoding failure for the data. When the transmitting node receives an ACK from the receiving node, the transmitting node may transmit new data in a subsequent transmission. However, when the transmitting node receives a NACK from the receiving node, the transmitting node may retransmit the same data to the receiving node. In some instances, the transmitting node may use the same encoding version for the initial transmission and the retransmission. In some other instances, the transmitting node may use different encoding versions for the initial transmission and the retransmission. The encoding versions may be referred to as redundancy versions. Different redundancy versions may include different combinations of systematic data information bits and error correction bit. In some aspects, the receiving node may perform soft-combining to decode the data based on the initial transmission and the retransmission. For simplicity of discussion and illustration, FIG. 2A illustrates the HARQ communication in the context of UL data communications, though similar HARQ mechanisms may be applied to DL data communications.

As an example, the UE 215 includes a HARQ component 220. The HARQ component 220 is configured to perform multiple parallel HARQ processes 222 for UL data communications. The HARQ processes 222 may operate independent of each other. In other words, the ACKs, NACKs, and/or retransmissions are determined and processed separately for each HARQ process 222 at the BS 205 and at the UE 215. Each HARQ process 222 may be identified by a HARQ process identifier (ID). For example, the HARQ processes 222 may be identified by identifiers H1, H2, . . . Hn. Each HARQ process 222 may have one or more TBs ready for transmission. In the illustrated example of FIG. 2A, the HARQ process H1 222 has one TB 230 ready for transmission and the HARQ process H2 222 has one TB 232 ready for transmission. The BS 205 may configure the UE 215 with configured resources for autonomous or unscheduled transmission. The UE 215 may transmit the TB 230 and the TB 232 to the BS 205 using a configured resource.

In some aspects, the BS 205 may configure the UE 215 with a configured resource 240. The configured resource 240 may be periodic. For instance, the configured resource 240 may be repeated at a time interval 242. The configured resource 240 may be partitioned into a plurality transmission time periods or slots 206. Each slot 206 may include any suitable number of OFDM symbols depending on the transmission configurations or numerology (e.g., the subcarrier spacing (SCS) and/or the cyclic prefix (CP) mode) in use.

The UE 215 may perform an LBT 250 in the frequency band 202 prior to a transmission. As an example, a first LBT 250 attempt for a transmission in a second slot 206 within the configured resource 240 failed (shown by the cross symbol). A second LBT 250 attempt for a transmission in a third slot 206 within the configured resource 240 also failed (shown by the cross symbol). A third LBT attempt for a transmission in a fourth slot 206 within the configured resource 240 is a pass. Thus, the UE 215 may initiate a transmission beginning at the fourth slot 206. Once the UE 215 won a contention (e.g., passing the LBT 250), the UE 215 may use the configured resource for a number of consecutive HARQ transmissions.

In the illustrated example of FIG. 2A, after passing the LBT 250, the UE 215 transmits four repetitions of the TB 230, denoted as TB A, followed by two repetitions of the TB 232, denoted as TB B, in consecutive slots 206. In some aspects, the UE 215 may transmit the repetitions for the TB 230 using different redundancy versions and/or the same redundancy versions. In some instances, each repetition may use a different RVN. In some instances, all repetitions may use the same RVN. In some instances, at least two repetitions may use the same RVN. Similarly, the UE 215 may transmit the repetitions for the TB 232 using different redundancy versions and/or the same redundancy versions. In some aspects, the UE 215 may include a RVN and/or a HARQ ID for each transmission, for example, in uplink control information (UCI) 260. For instance, the RVN may indicate a RV0, a RV1, a RV2, a RV3, a RV4, and so on. Each transmission for the TB A 230 may include UCI 260 indicating a HARQ ID H1. Similarly, each transmission for the TB B 232 may include UCI 260 indicating a HARQ ID H2. The UE 215 may further indicate whether a transmission is an initial transmission or a retransmission by including a new data indicator (NDI) in the UCI 260. For example, the NDI may be set to a value of 1 to indicate that a corresponding transmission is an initial transmission and may be set to a value of 0 to indicate that a corresponding transmission is a retransmission. For instance, the UCI 260 for each transmission of the TB A 230 may include a NDI with a value of 1 to indicate that the repetitions of the TB A 230 are associated with an in initial transmissions of the TB A 230. The UCI 260 for each transmission of the TB B 232 may include a NDI with a value of 0 to indicate that the repetitions of the TB B 232 are associated with a retransmission of the TB B 232. In some aspects, the UE 215 may determine a RV sequence (e.g., a sequence of RVNs) for transmitting one or more redundancy versions of a TB in a configured resource and/or how to prioritize transmission of one TB of a certain HARQ process 222 over another TB of another HARQ process 222 without assistance from the BS 205. In some other instances, the BS 205 may provide the UE with some assistance in the RV sequence determination and/or HARQ ID selection.

Figure 2B:
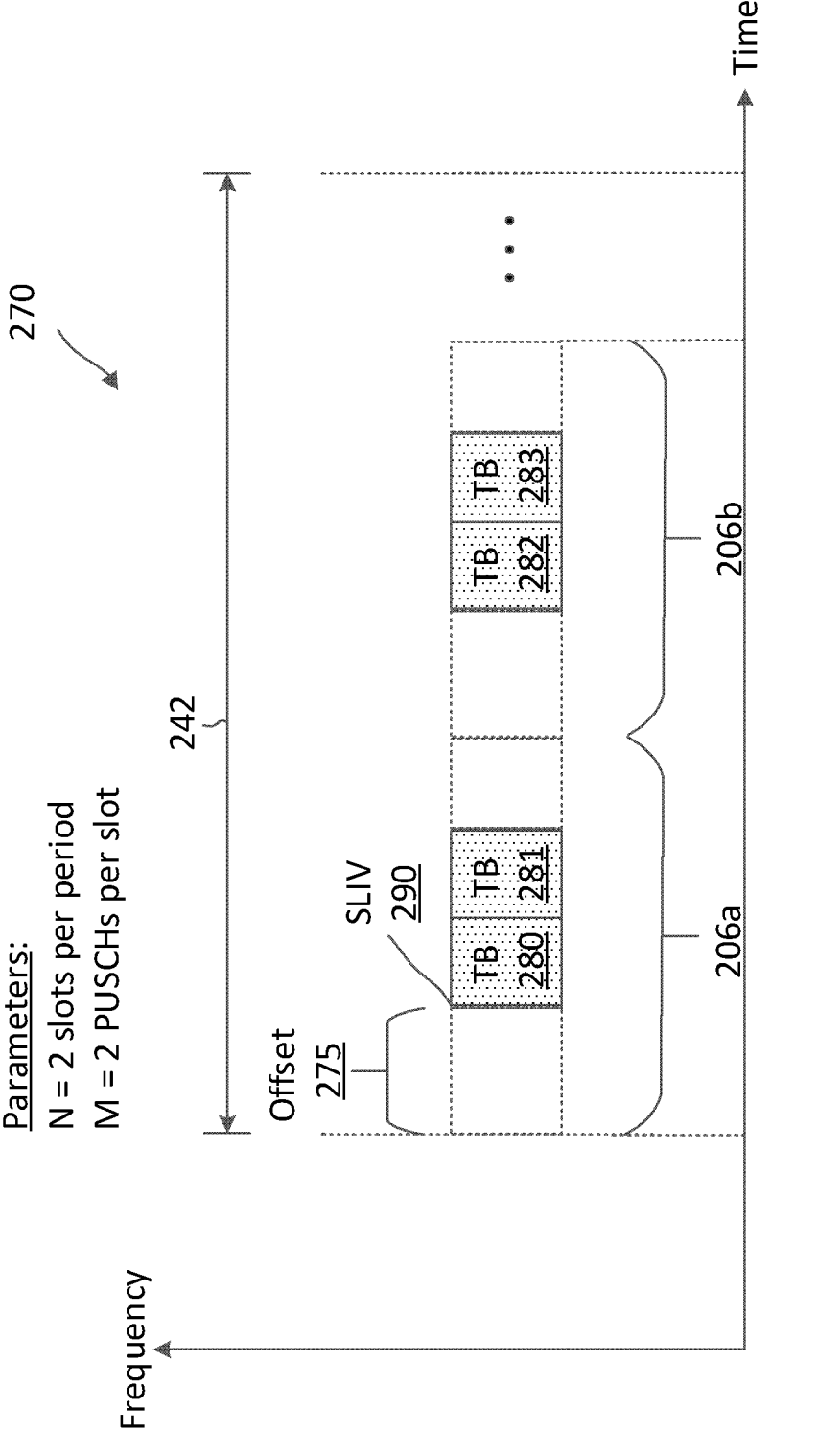
FIG. 2B illustrates a HARQ communication scenario according to some aspects of the present disclosure.

FIG. 2B illustrates a hybrid automatic repeat request (HARQ) communication scenario according to some aspects of the present disclosure. The functionality of scheme 270 can be executed by a computing device (e.g., a processor, processing circuit, and/or other suitable component) of a wireless communication device or other suitable means. In some aspects, a wireless communication device such as the UE 115 or UE 800 of FIG. 3 may utilize one or more components, such as the processor 802, the memory 804, the Multi-TB Repetition Module 808, the transceiver 810, the modem 812, and the one or more antennas 816, to execute the steps of scheme 270. Further, a wireless communication device such as the base station (BS) 105 or BS 900 of FIG. 9 may utilize one or more components, such as the processor 902, the memory 904, the Multi-TB Repetition Module 908, the transceiver 910, the modem 912, and the one or more antennas 916, to execute the steps of scheme 270. The scheme 270 may employ similar mechanisms as described in FIGS. 1-2A. In FIG. 2B, the x-axis represents time in some arbitrary units, and the y-axis represents frequency in some arbitrary units.

As illustrated in FIG. 2B, TBs 280, 281, 282, and 283 may be transmitted in more than one slot 206a and 206b of a configured grant resource 242. For instance, TBs may be transmitted in a number N slots per period. More than one TB may be transmitted in each of the multiple slots of the configured grant resource. For instance, TBs may be transmitted in a number M PUSCHs per slot. The BS may configure a number of HARQ processes Y (or nrofHARQ-Processes) associated with the PUSCHs of the configured grant resource 242. The configured grant resource 242 may be in a licensed or unlicensed frequency band or spectrum.

A BS may provide a UE with an information element or parameter(s) including a start and length indicator value (SLIV) 290 for a first PUSCH (time domain allocation) in a slot, where a SLIV indicates the starting position in terms of the current symbol or a symbol index and the length of the PUSCH. The PUSCH starting position and length may repeat over each of the plurality of slots associated with the configured grant resources. For instance, SLIV 290 indicates the position of the first PUSCH of the first slot 206a of the configured grant resource 242. The position of the first PUSCH of the first slot may be offset 275 from the beginning of the configured grant resource 242. The SLIV 290 may also indicate a length or number of symbols for each PUSCH.

In some aspects, communicating the TBs 280, 281, 282, and 283 comprises receiving, by a first wireless communication device (e.g., BS 105/400), a TB on a PUSCH associated with the starting HARQ process ID. In some instances, communicating a TB comprises transmitting, by a first wireless communication device (e.g., UE 115/300), a TB on a PUSCH associated with a starting HARQ process ID.

In some aspects, it may be desirable to allow a UE to transmit more than one TB and with repetitions. Further, it may be advantageous to allow a UE to determine the number of TBs transmitted in a PUSCH to balance data transfer rates and reliability, particularly in the unlicensed bands. Accordingly, FIGS. 3A-7B describe various mechanisms for multi-TB PUSCH repetitions for CG UL transmissions in shared frequency bands in a shared spectrum or an unlicensed spectrum.

Figure 3A:
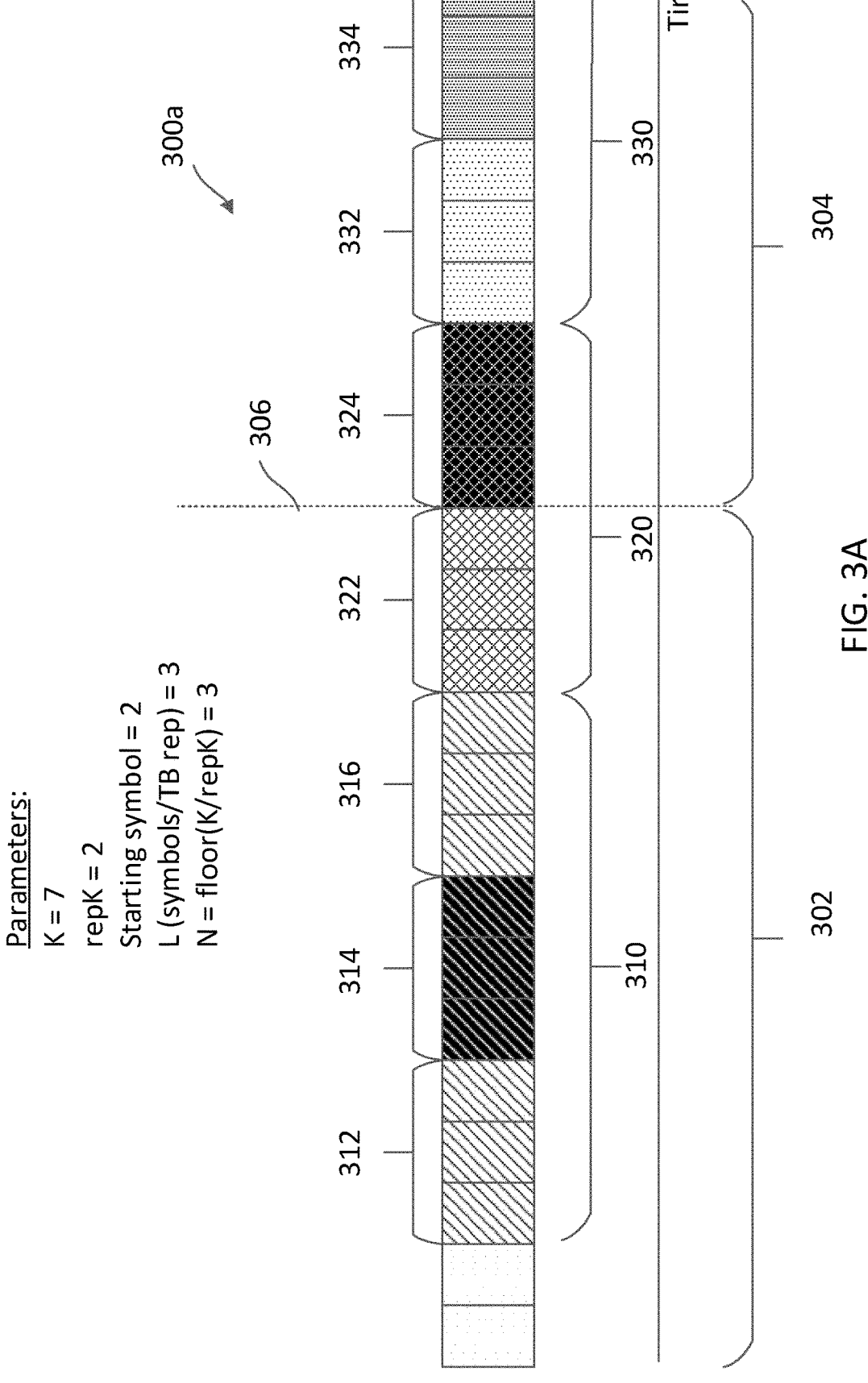
FIG. 3A illustrates a multi-transport block (TB) communication scheme according to some aspects of the present disclosure.
Figure 3B:
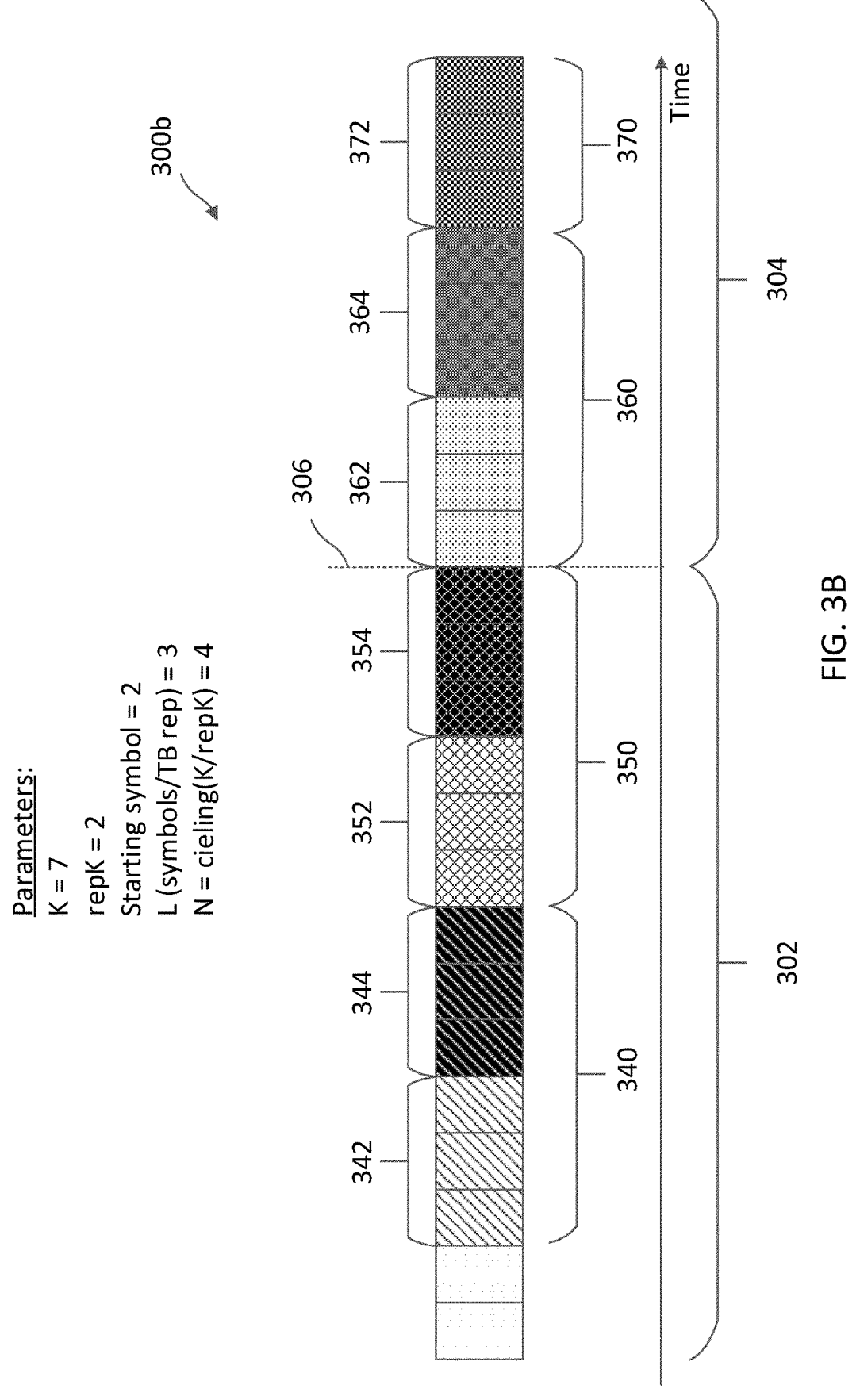
FIG. 3B illustrates a multi-TB communication scheme according to some aspects of the present disclosure.

FIGS. 3A and 3B illustrate multi-TB communication schemes 300a, 300b according to some aspects of the present disclosure. The schemes 300a, 300b may correspond to a CG communication scenario in the network 100 in which the network 100 operates over a shared frequency band or an unlicensed frequency band. In FIGS. 3A and 3B, the x-axis represents time in some constant units. In the schemes 300a, 300b, a BS similar to the BSs 105 may communicate data with a UE similar to the UEs 115 using a CG resource which includes a first slot 302 and a second slot 304, which is contiguous with the first slot 302, over a frequency band, which may be a licensed frequency band or a shared radio frequency band in a shared spectrum or an unlicensed spectrum, shared by multiple network operating entities. The frequency band may be located at any suitable frequencies. In some aspects, the frequency band may be located at about 3.5 GHz, 6 GHz, or 30 GHz. The communication schemes 300a, 300b may be performed according to a Type-B PUSCH TB repetition procedure. The UE may utilize one or more components of the UE 800 illustrated in FIG. 8, for example, such as the processor 802, the memory 804, the Multi-TB Repetition Module 808, the transceiver 810, the modem 812, and the one or more antennas 816, to execute the steps of schemes 300a, 300b. Further, the BS may utilize one or more of the components of the BS 900 shown in FIG. 9, such as the processor 902, the memory 904, the Multi-TB Repetition Module 908, the transceiver 910, the modem 912, and the one or more antennas 916, to execute the steps of schemes 300a, 300b.

Referring to FIG. 3A, the scheme 300a includes transmitting, in the CG resource, a UL communication including a plurality of TB repetitions 312, 314, 316, 322, 324, 332, 334 corresponding to a plurality of TBs 310, 320, 330. The TB repetitions are configured and transmitted according to a Type-B repetition procedure or mode, wherein multiple TB repetitions are transmitted within a single slot, such as the slot 302. For example, the UE transmits, in the first slot 302 of the CG resource, the TB repetitions 312, 314, 316, which correspond to a first TB 310, and the TB repetition 322, which corresponds to a second TB 320. The UE transmits the TB repetition 324, which also corresponds to the second TB 320, and the TB repetitions 332 and 334, which correspond to the third TB 330, in the second slot 304 of the CG resource.

The UE may determine the arrangement or configuration of the TB repetitions based on a type-B PUSCH repetition configuration, which includes the parameters shown in FIG. 3A. The type-B PUSCH repetition configuration may be configured by a BS, for example, and may be included in a CG configuration. The CG configuration may be a Type-1 CG grant or a Type-2 CG grant. A CG configuration for Type-1 CG grant for the UE can be configured via RRC signaling, where the UE may start to utilize the CG resources for transmission after the configuration. CG configuration for Type-2 CG grant for the UE can be configured via RRC signaling and activated via DCI signaling, where the UE may utilize the CG resources for transmission after receiving the activation DCI. The BS may indicate type-B PUSCH repetition configuration parameters in an RRC configuration and/or DCI (e.g., for Type-2 CG grant). For example, for Type-1 CG grant, if the RRC parameter pusch-RepTypeIndicator-r16 in rrc-ConfiguredUplinkGrant is configured and set to 'pusch-RepTypeB', PUSCH repetition type B is applied. For Type-2 CG grant, the PUSCH repetition type is determined by the PUSCH repetition type associated with UL grant received on the DCI. For CG activated by DCI format 0_1, if pusch-Rep TypeIndicator-ForDCI-Format0-1-r16 is set to 'pusch-RepTypeB', the UE applies PUSCH repetition Type B procedure. For CG activated by DCI format 0_2, if pusch-Rep TypeIndicator-ForDCI-Format0-2-r16 is set to 'pusch-RepTypeB', the UE applies PUSCH repetition Type B procedure. The type-B PUSCH repetition configuration may indicate a first number of repetitions K, which the UE may interpret as a total number of TB repetitions for the CG resource, a second number of repetitions repK, a starting symbol for the first TB repetition 312 in the slot 302, a length of each TB repetition (in symbols) L, and a number of TBs transmitted within the CG resource N. In some aspects both the starting symbol and the length L may be indicated as a SLIV parameter, as described above. In the scenario 300a, the UE determines the number of TBs N based on a ratio of the first number of TB repetitions K to the second number of TB repetitions repK. Because the ratio may result in a fractional number, the UE applies a floor operation to the ratio to round the ratio down to the nearest integer. For example, in the scenario 300a, the ratio K/repK is 7/2=3.5. Accordingly, the UE applies the floor function to the ratio, which results in a number of TBs (N) of 3. In some aspects, rounding down using the floor operation may result in a greater number of repetitions compared to using a ceiling operation, as explained further below. Accordingly, the scenario 300a, which uses the floor operation, may prioritize reliability by allowing a greater number of repetitions for each TB on average compared to using a ceiling operation.

The TB repetitions 312, 314, 316, 322, 324, 332, 334 may be referred to as nominal repetitions and/or actual repetitions. A nominal repetition may refer to a repetition that is configured or signaling by a BS. A nominal repetition can be segmented into multiple repetitions when the nominal repetition span across a slot boundary or a switch from UL to DL. An actual repetition may refer to a repetition of a TB that is actually transmitted by the UE. That is, the nominal repetitions are those that are contiguous and are transmitted by the UE within a same slot (e.g., 302). Nominal repetitions which straddle a slot boundary 306 are separated into two actual repetitions. In the scheme 300a, all of the TB repetitions are nominal, and none straddle the slot boundary 306. In this regard, the TB repetitions 312, 314, 316, 322, 324, 332, 334 may be referred to as either nominal repetitions or actual repetitions. Examples of nominal repetitions with segmentation and actual repetitions will be discussed more fully below with reference to FIGS. 4A and 4B.

Referring to FIG. 3B, the scheme 300b includes transmitting, in the CG resource, a UL communication including a plurality of TB repetitions 342, 344, 352, 354, 362, 364, 372 corresponding to a plurality of TBs 340, 350, 360, 370. The TB repetitions are configured and transmitted according to a type-B PUSCH repetition configuration, wherein multiple TB repetitions are transmitted within a single slot, such as the slot 302 and the slot 304. For example, the UE transmits, in the first slot 302 of the CG resource, the TB repetitions 342, 344, which correspond to a first TB 340, and the TB repetitions 352, 354, which correspond to a second TB 350. The UE transmits the TBs 362, 364, which correspond to the third TB 360, and the TB repetition 372, which corresponds to a fourth TB 370, in the second slot 304 of the CG resource.

The type-B PUSCH repetition configuration includes the same types of parameters shown in the scheme 300a of FIG. 3A, but with a different formula for determining the number of TBs N. In this regard, in the scenario 300b, the parameters of the type-B repetition configuration indicate that the first number of repetitions K is 7, repK is 2, starting symbol is 2, and L is 3. In contrast to the scenario 300a, the UE in the scenario 300b determines or calculates N using a ceiling operation on the ratio of K to repK to round up to the nearest integer. Accordingly, the UE applies the ceiling function to the ratio and determines that the number of TBs (N) is 4. In some aspects, rounding up using the ceiling operation may result in a greater number of TBs N but a lower number of TB repetitions for some or all of the TBs compared to using a floor operation. Accordingly, the scenario 300b, which uses the ceiling operation, may prioritize higher data transfer rates by providing for more TBs to be transmitted in a PUSCH on average compared to using a floor operation.

In some aspects, the UE may be configured to treat, as an error case, a CG configuration in which K is less than repK. In this regard, if K is less than repK in the CG configuration, applying the floor operation to the ratio of K/repK would result in the UE determining that the number of TBs is 0. Similarly, if K is less than repK, the UE applying the ceiling operation to the ratio of K/repK would result in the UE determining that the number of TBs is 1. Accordingly, the UE may not expect to receive a configuration in which K is less than repK. For example, for type 1 CG, the UE may not expect to receive a configuration in which the number of repetitions in the configured row of a TDRA table is less than repK. For type 2 CG, the UE may not expect to receive an activation DCI having a row of a TDRA table in which the indicated number of repetitions is less than repK. In these instances, the UE may treat this as an error case. For example, the UE may refrain from using the CG resource, and/or from using the multi-TB configuration.

In other aspects, in response to receiving a CG configuration in which K is less than repK, the UE may revert to or operate using single-TB type B PUSCH repetition. In one example, if K is less than repK, the UE may determine whether numberOfRepetitions-r16 is present in the TDRA table. If numberOfRepetitions-r16 is present, the UE sets the total number of TB repetitions (e.g., K) to numberOfRepetitions-r16. If numberOfRepetitions-r16 is not present, the UE may set the total number of TB repetitions to repK. In another example, if K is less than repK, the UE may perform single-TB type-B PUSCH repetition using repK as the total number of TB repetitions, regardless of whether numberOfRepetitions-r16 is present in the TDRA table.

The schemes 300a and 300b advantageously enhance CG-UL communications by allowing multiple TBs to be transmitted within a slot, where each TB is transmitted with multiple TB repetitions. Accordingly, the reliability of the communications is maintained while reducing the latency and increasing throughput. By modifying the parameters, such as the formula used to determine the number of TBs (e.g., floor operation, ceiling operation), the interests of throughput and reliability can be balanced or tailored for specific use cases and devices.

In some aspects, the BS may configure the UE with a configuration or a rule to select the mechanisms shown in FIG. 3A or the mechanisms shown in FIG. 3B for multi-TB repetitions transmission with PUSCH type-B repetitions. In some aspects, the UE may utilize the mechanisms shown in FIG. 3A or the mechanisms shown in FIG. 3B for multi-TB repetitions transmission with PUSCH type-B repetitions based on a predetermined configuration (e.g., specified by a standard). In some aspects, the UE may select the mechanisms shown in FIG. 3A or the mechanisms shown in FIG. 3B for multi-TB repetitions transmission with PUSCH type-B repetitions and indicate the selection to the BS.

As explained above, one or more of the TB repetitions may include a CG-UCI identifying the TB by a reference number, such as a HARQ Process ID or a TB index. For example, if the BS fails to successfully decode a TB, the BS will transmit, to the UE, a retransmission request (a retransmission schedule) indicating the specific TB(s) that were not decoded for retransmission. The retransmission request may be included in a DCI, for example. In some aspects, the UE may identify the TBs of a UL communication using the HARQ procedures described above with respect to FIG. 2A, including using a HARQ process ID for each TB and/or TB repetition. The present disclosure describes different mechanisms for indicating the HARQ process ID associated with a TB repetition in a multi-TB PUSCH repetition communication scenario. In particular, the schemes shown in FIGS. 4A-5F illustrate examples of the mechanisms for identifying the HARQ process ID using CG-UCI and/or a HARQ process ID calculation, whereby a UE and/or a BS may determine or infer the HARQ process ID of a given TB repetition based on a formula.

Figures 4A, 4B:
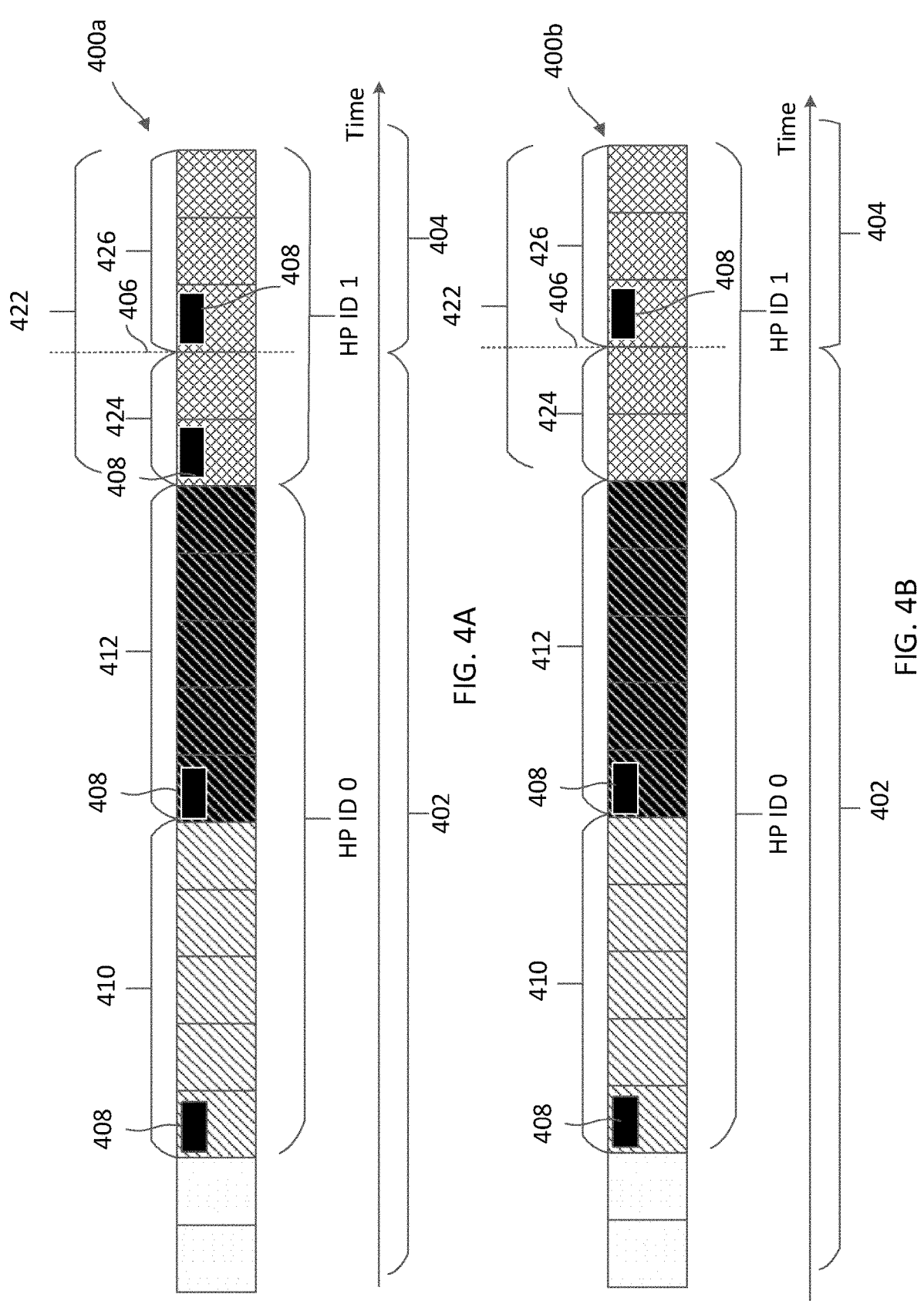
FIG. 4A illustrates a scheme for indicating HARQ process identifiers (IDs) of one or more TB repetitions using configured grant uplink control information (CG-UCI) according to some aspects of the present disclosure.
FIG. 4B illustrates a scheme for indicating HARQ process identifiers (IDs) of one or more TB repetitions using configured grant uplink control information (CG-UCI) according to some aspects of the present disclosure.

FIGS. 4A and 4B illustrate schemes 400a, 400b for indicating the HARQ process IDs of one or more TB repetitions using CG-UCI, according to some aspects of the present disclosure. In FIGS. 4A and 4B, each of the boxes represents an OFDM symbol. The schemes 400a, 400b may be performed by a UE, such as one of the UEs 115, 215 described above, and a BS, such as one of the BSs 105, 205 described above. The UE may utilize one or more components of the UE 800 illustrated in FIG. 8, for example, such as the processor 802, the memory 804, the Multi-TB Repetition Module 808, the transceiver 810, the modem 812, and the one or more antennas 816, to execute the steps of schemes 400a, 400b. Further, the BS may utilize one or more of the components of the BS 900 shown in FIG. 9, such as the processor 902, the memory 904, the Multi-TB Repetition Module 908, the transceiver 910, the modem 912, and the one or more antennas 916, to execute the steps of schemes 400a, 400b.

In the schemes 400a. 400b, a UE transmits a UL communication in a CG resource (e.g., CG-PUSCH). The UL communication includes a plurality of TB repetitions, 410, 412, 422, which may be referred to as nominal repetitions. A third TB repetition 422 extends across a slot boundary 406. Accordingly, the third TB repetition 422 may be described as having two actual, repetitions 424 and 426. That is, the UE may transmit a repetition 424 of a TB and another repetition 426 of the TB. As can be seen, each of the repetition 424 and 426 occupies a less number of symbols than the repetition 410 and 420 due to the partitioning of the nominal repetition 422. In some instances, the UE may apply rate-matching to transmit each of the TB repetitions 424 and 426. Further, it will be understood that the TB repetitions 410 and 412 may also be actual repetitions. Accordingly, in the schemes 400a, 400b, the UL communication includes three nominal repetitions: 410, 412, 422; and four actual repetitions: 410, 412, 424, and 426. The nominal TB repetitions 410, 412 are associated with a first TB and a first HARQ process ID (HP ID 0). The second nominal repetition 422 is associated with a second HARQ process ID (HP ID 1), where a first actual repetition 424 associated with the TB repetition 422 is transmitted in the first slot 402, and the second actual repetition 426 associated with the TB repetition 422 is transmitted in the second slot 404.

In some aspects, the UE may indicate, to the BS the HARQ process ID for each of the TB repetitions. The HARQ process ID may be used in an HARQ process whereby the BS either acknowledges that a TB was successfully received and decoded, or requests that the TB be retransmitted. The UE may indicate the HARQ process ID in a CG-UCI 408 transmitted in a corresponding TB repetition. For example, referring to the scheme 400a of FIG. 4A, the UE is configured to transmit a CG-UCI 408 in each of the actual repetitions, including the actual repetition 424, and the actual repetition 426. Referring to the scheme 400b of FIG. 4B, the UE is configured to transmit a CG-UCI 408 in each of the nominal repetitions. However, since the third nominal repetition 422 is divided by the slot boundary 406, the UE is configured to transmit a CG-UCI 408 indicating the HARQ process ID for the third nominal repetition 422 (HP ID 1) in the last of the corresponding actual repetitions, which is the second actual repetition 426. In other aspects, the UE may be configured to transmit the CG-UCI 408 in the first actual repetition of a plurality of actual repetitions (e.g., actual repetition 424).

In other aspects, a UE and/or a BS may be configured to determine a HARQ process ID based on a formula or rule. Accordingly, the UE may not indicate the HARQ process ID for each TB repetition, in some instances. Rather, the UE and/or the BS may apply the rule or formula based on information associated with the UL communication to determine a HARQ process ID for each TB and TB repetition in the UL communication. In this regard, FIGS. 5A-5E illustrate schemes 500 for determining the HARQ process IDs of a plurality of TBs in a multi-TB PUSCH repetition scenario using predefined rules and equations, according to some aspects of the present disclosure. In FIGS. 5A-5E, each of the boxes represents a TB repetition, where each TB repetition may span 1 or more OFDM symbols, including values of 2, 3, 4, 5, 6, or any other suitable number of symbols. The TB repetitions are associated with different TBs and different HARQ process IDs (HP ID), such that each TB is associated with a HARQ process ID. The parameters of the TB repetition configuration (e.g., type-B PUSCH repetition) may be configured by a BS, for example. The parameters may include those shown in FIGS. 3A and 3B, including the number of repetitions K, the number of repetitions repK, the repetition length L, the first symbol of the first TB repetition, and/or the number of TBs N. The schemes 500 may be performed by a UE, such as one of the UEs 115, 215 described above, and a BS, such as one of the BSs 105, 205 described above. The UE may utilize one or more components of the UE 800 illustrated in FIG. 8, for example, such as the processor 802, the memory 804, the Multi-TB Repetition Module 808, the transceiver 810, the modem 812, and the one or more antennas 816, to execute the steps of schemes 500. Further, the BS may utilize one or more of the components of the BS 900 shown in FIG. 9, such as the processor 902, the memory 904, the Multi-TB Repetition Module 908, the transceiver 910, the modem 912, and the one or more antennas 916, to execute the steps of schemes 500.

Figures 5A, 5B:
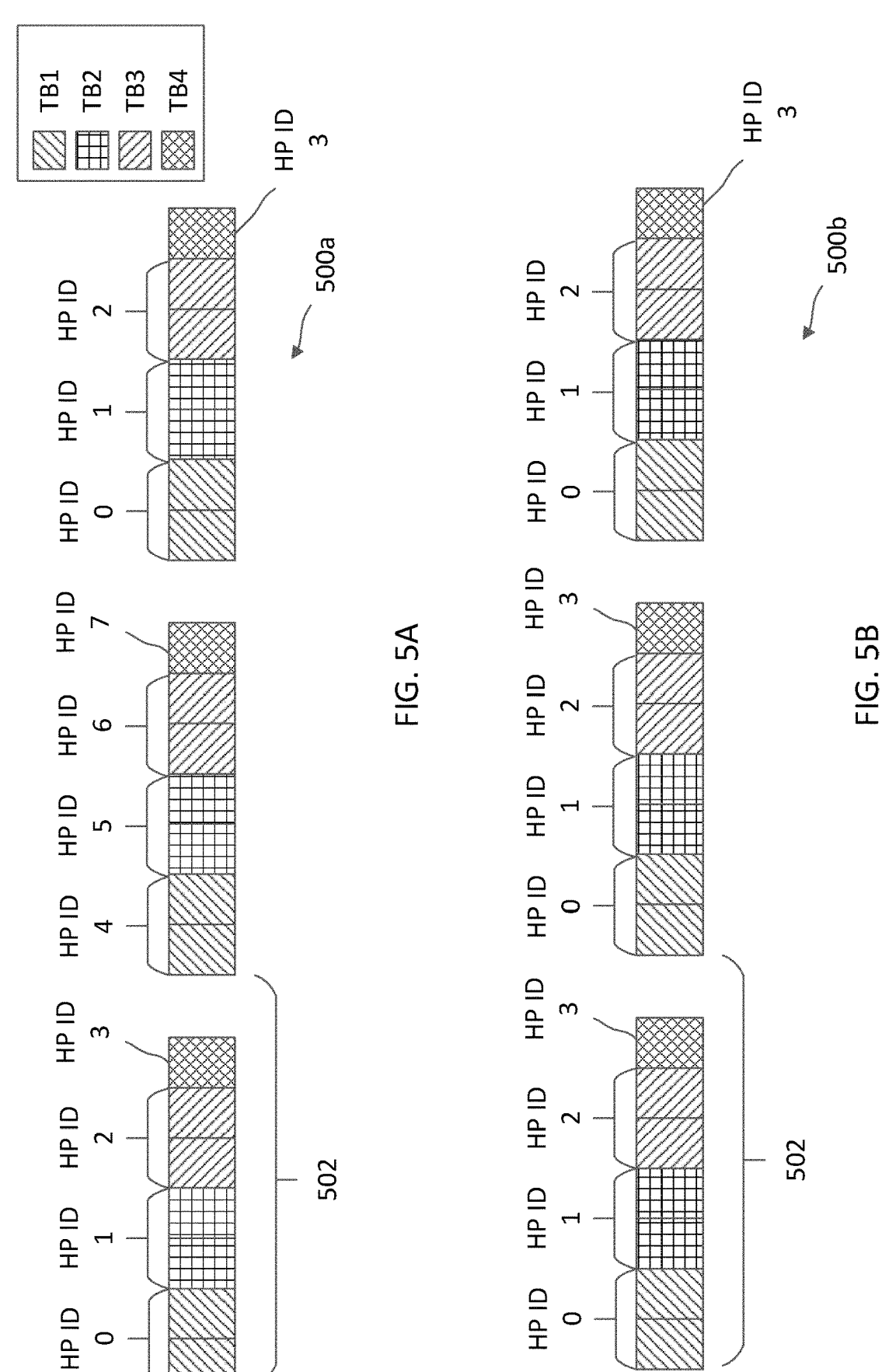
FIG. 5A illustrates a scheme for determining HARQ process IDs for a plurality of TB repetitions according to some aspects of the present disclosure.
FIG. 5B illustrates a scheme for determining HARQ process IDs for a plurality of TB repetitions according to some aspects of the present disclosure.

FIGS. 5A and 5B illustrate schemes 500a, 500b for determining HARQ process IDs for each TB repetition of a plurality of TB repetitions using a first type of equation, according to aspects of the present disclosure. In the schemes 500a and 500b, the UE and/or the BS may determine the HP ID based on a first symbol of a first TB repetition (e.g., SLIV), a periodicity 502 of the TB repetition configuration, the total number of TB repetitions (e.g., K), and the number of TBs (e.g., N). For example, in the schemes 500a, 500b, the UE and/or the BS may determine a first HARQ process ID based on the following equation:

$$\text{first } HP\ ID = \left\{\left[\text{floor}\left(\frac{\text{CURRENT\_symbol}}{\text{periodicity}}\right)\right]\text{modulo}\left[\frac{nrofHARQ - \text{Processes}}{N}\right]\right\} * N$$

where CURRENT_symbol is the first symbol of the UL communication, the periodicity is the period 502 of the TB repetition configuration in symbols, and nrofHARQ-Processes is the number of HARQ process IDs included in the UL communication. In some aspects, these parameters may be configured by the BS in a CG configuration using RRC signaling, for example. The UE and/or the BS may then determine the following HARQ process IDs based on the following equation:

$$HPID = (\text{first } HP\ ID + n)\text{modulo}(nrofHARQ - \text{Processes})$$

where n=1, . . . , N−1.

Although the schemes 500a, 500b involve a same number of TBs and TB repetitions and the equation used to determine the HP IDs is the same, the HP IDs shown in FIG. 5B include some differences compared to the scheme 500a of FIG. 5A. In particular, in the scheme 500a, the HARQ process IDs for each TB increments by one from HP ID 0 to HP ID 7. For example, in the scheme 500a, the CG configuration may indicate that nrofHARQ-Processes is 8. In the scheme 500b, however, the CG configuration indicate that nrofHARQ-Processes is 4. Accordingly, the HARQ process ID increases incrementally by one from HP ID 0 to HP ID 3.

Figures 5C, 5D, 5E:
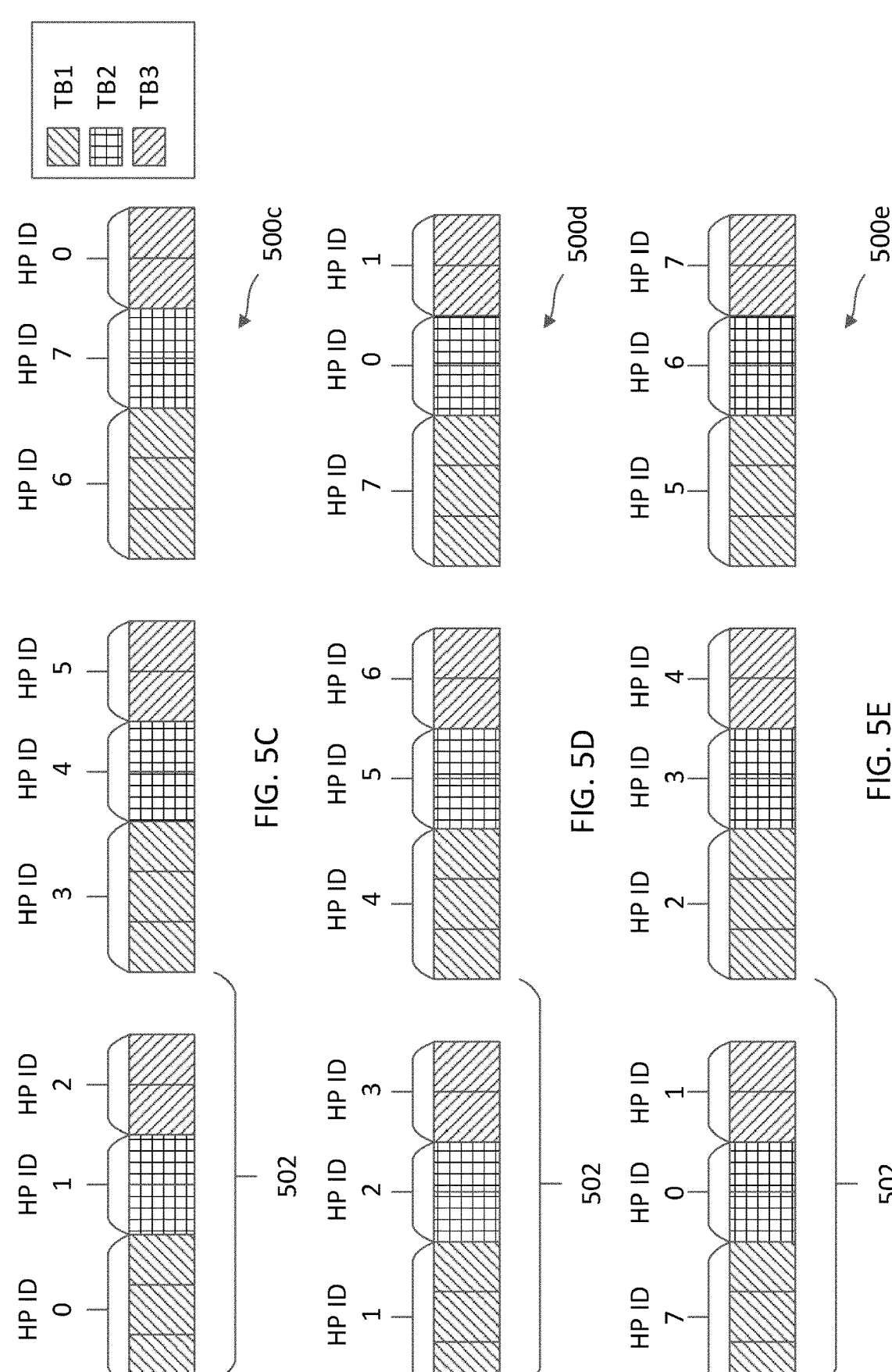
FIG. 5C illustrates a scheme for determining HARQ process IDs for a plurality of TB repetitions according to some aspects of the present disclosure.
FIG. 5D illustrates a scheme for determining HARQ process IDs for a plurality of TB repetitions according to some aspects of the present disclosure.
FIG. 5E illustrates a scheme for determining HARQ process IDs for a plurality of TB repetitions according to some aspects of the present disclosure.

In some aspects, the equation discussed above with respect to FIGS. 5A and 5B may not be suitable for configurations in which nrofHARQ-Processes/N is not an integer. FIGS. 5C, 5D, and 5E illustrate schemes 500c, 500d, 500e using a modified equation that may be used for configurations in which nrofHARQ-Processes/N is not an integer. Similar to the schemes 500a and 500b, in the schemes 500c-500e, the UE and/or the BS may determine the HARQ process IDs based on a first symbol of a first TB repetition, a length of the TB repetitions (e.g., SLIV), a periodicity 502 of the TB repetition configuration, the total number of TB repetitions (e.g., K), and the number of TBs (e.g., N). However, the equation used in the schemes 500c-500e may be of the form:

$$\text{first } HP\ ID =$$
$$\left\{\left[\text{floor}\left(\frac{\text{CURRENT\_symbol}}{\text{periodicity}}\right)\right]\text{modulo}\left[\text{ceil}\left(\frac{nrofHARQ - \text{Processes}}{N}\right)\right]\right\} *$$
$$N + [i]\text{modulo}[nrofHARQ - \text{Processes}]$$

where CURRENT_symbol is the first symbol of the UL communication, the periodicity is the period 502 of the TB repetition configuration in symbols, nrofHARQ-Processes is the number of HARQ process IDs included in the UL communication, and i is determined based on the equation $$i = \left\{\text{floor}\left\{\frac{\dfrac{CURRENTsymbol}{\text{periodicity}}}{\left[\text{ceil}\left(\dfrac{nrofHARQ - Processes}{N}\right)\right]}\right\}\right.$$
$$\left.\vphantom{\Bigg|} \text{modulo}(nrofHARQ - \text{Processes})\right\} * [$$
$$N - (nrofHARQ - \text{Processes})\text{modulo } N],$$
$$\text{if } nrofHARQ - \text{Processes modulo } N \neq 0,$$
$$\text{otherwise } i = 0$$

The UE and/or the BS may then determine the following HARQ process IDs based on the following equation:

$$HP\ ID = (\text{first } HP\ ID + n)\text{modulo}(nrofHARQ - \text{Processes})$$

where n=1, . . . , N−1.

Although the schemes 500c-500e involve a same number of TBs and TB repetitions and the equation used to determine the HARQ process IDs is the same, the HARQ process IDs for each TB vary in each of the schemes 500c, 500d, 500e based on the parameter i, which is not included in the first equation used in the schemes 500a, 500b. In particular, in the scheme 500c, the parameter i is set to 0. In the scheme 500d, the parameter i is set to 1. In the scheme 500e, the parameter i is set to 7. Accordingly, in the scheme 500c, the HP IDs for the TBs increase incrementally from 0 to 7, and start over at HP ID 0. In the scheme 500d, the HARQ process IDs start at HP ID 1, increase incrementally from 1 to 7, and start over at HP ID 0. In the scheme 500e, the HARQ process IDs start at HP ID 7 based on the equation above, start over at HP ID 0, and increase incrementally to HP ID 7. Thus, the in the schemes 500c-500e shown in FIGS. 5C-5E, the UE and/or the BS may determine a HARQ process ID for a TB in a UL communication without receiving a CG-UCI in each TB, even when nrofHARQ-Processes/N is not an integer.

If a TB is not successfully received and/or decoded by a BS, the BS may transmit, to the UE, a retransmission request indicating which of the TBs in a UL communication are to be retransmitted. Accordingly, the retransmission request may schedule a retransmission of one or more of the TBs in one or more slots. In some aspects, the BS may schedule a single TB retransmission per PDCCH per slot, where the PDCCH is scrambled by configured scheduling radio network temporary identifier (CS-RNTI) with NDI=1. Accordingly, the BS may indicate, in each PDCCH, a retransmission request for a single TB. In other aspects, the BS may schedule multiple TB retransmissions and indicate multiple retransmission requests/schedules in a PDCCH. The retransmission request may identify the TBs by the corresponding HARQ process IDs or TB indices.

Figure 6:
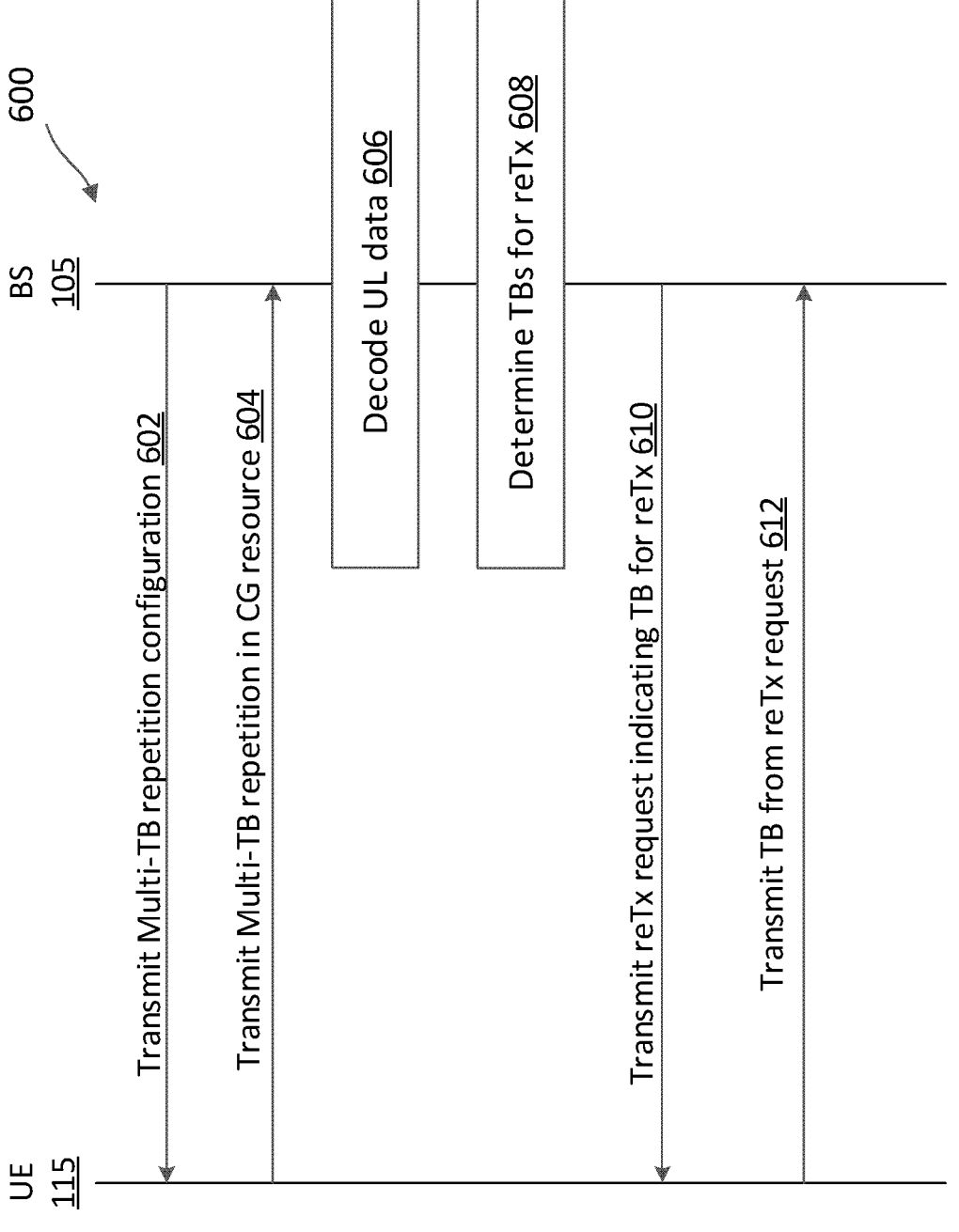
FIG. 6 is a signaling diagram illustrating a method for requesting and performing a TB retransmission, according to some aspects of the present disclosure.

FIG. 6 is a signaling diagram illustrating a method 600 for requesting and performing a TB retransmission, according to aspects of the present disclosure. The method 600 is performed by a UE 115, which may be one of the UEs 115 of the network 11, and a BS 105, which may be one of the BSs 105 of the network 100. The UE 115 and/or the BS 105 may be configured to multi-TB repetition communications, such as type-B PUSCH repetition with multi-TB repetitions enabled. The UE 115 may utilize one or more components of the UE 800 illustrated in FIG. 8, for example, such as the processor 802, the memory 804, the Multi-TB Repetition Module 808, the transceiver 810, the modem 812, and the one or more antennas 816, to execute the steps of the method 600. Further, the BS 105 may utilize one or more of the components of the BS 900 shown in FIG. 9, such as the processor 902, the memory 904, the Multi-TB Repetition Module 908, the transceiver 910, the modem 912, and the one or more antennas 916, to execute the steps of the method 600.

At action 602, the BS 105 transmits a multi-TB repetition configuration to the UE 115. Transmitting the multi-TB repetition configuration may include transmitting DCI. In some aspects, the CG configuration may include a multi-TB repetition configuration field indicating whether multi-TB repetition is enabled. For example, the BS 105 may indicate to the UE whether multi-TB PUSCH repetition or single TB PUSCH repetition is enabled using RRC signaling. For example, an RRC parameter or configuration in a RRC message transmitted by the BS may indicate whether multi-TB PUSCH repetition is enabled. The RRC configuration may include a multi-TB repetition configuration, and the UE 115 may enable multi-TB repetition based on the configuration being present. If the configuration is not present, the UE may determine that single TB repetition (e.g., type-B PUSCH repetition) is enabled. In other aspects, the RRC configuration includes a multi-TB repetition enabled field, and the UE determines whether to enable multi-TB repetition based on the value of the field. For example, if the multi-TB repetition enabled field has a value of 1, the UE may enable multi-TB repetition. If the multi-TB repetition enabled field has a value of 0, the UE may not enable multi-TB repetition, and instead enable single TB repetition.

At action 604, the UE 115 transmits a UL communication including multi-TB repetitions in a CG resource (e.g., CG-PUSCH). In some aspects, the UE 115 may prepare the TB repetitions for transmission using the schemes 300a, 300b, 400a, 400b, 500a-500e described above. For example, the UE 115 may determine the number of TBs for transmission in the UL communication based on a plurality of parameters in a multi-TB configuration, including the At action 606, the BS 105 decodes, or attempts to decode, the UL communication including the multi-TB repetitions from the CG resource, for example, based on the CG configuration and multi-TB repetition configuration provided to the UE 115.

At action 608, based on the decoding, the BS 105 determines one or more TBs for retransmission. For example, the BS 105 may perform an HARQ procedure to determine whether one or more of the TBs were not successfully decoded, and identify any unsuccessful TBs based on their HARQ process IDs or other TB index. In some aspects, action 608 may include generating a retransmission request indicating which of the TBs will be included in the retransmission request.

At action 610, the BS 105 transmits the retransmission request to the UE 115, wherein the retransmission request indicates the one or more TBs for retransmission. In some aspects, transmitting the retransmission request may include transmitting the request in a PDCCH.

According to one aspect, the BS may transmit the retransmission request in a PDCCH scrambled by CS-RNTI with NDI=1. In some aspects, the BS may schedule a single TB retransmission for each PDCCH in a slot. In other aspects, the BS may schedule multiple TB retransmissions using a single PDCCH. In some aspects, the retransmission request may be included in a DCI, which includes a bitmap and an indication of a HARQ process ID associated with a first bit in the bitmap. Each bit in the bitmap can indicate whether retransmission is requested for a corresponding TB index. In some aspects, the HARQ process ID of a first HARQ process in a UL communication transmitted at action 604 may be indicated by an HPN field in the retransmission request. In some aspects, the retransmission request may include a TDRA field which indicates the time domain resource allocation for the first retransmitted TB, and the TDRAs for the remaining retransmitted TBs may be appended to the TDRA of the first retransmitted TB back-to-back. In some aspects, the BS 105 may transmit the retransmission request in a DCI (scheduling grant) over a PDCCH.

Figures 7A, 7B:
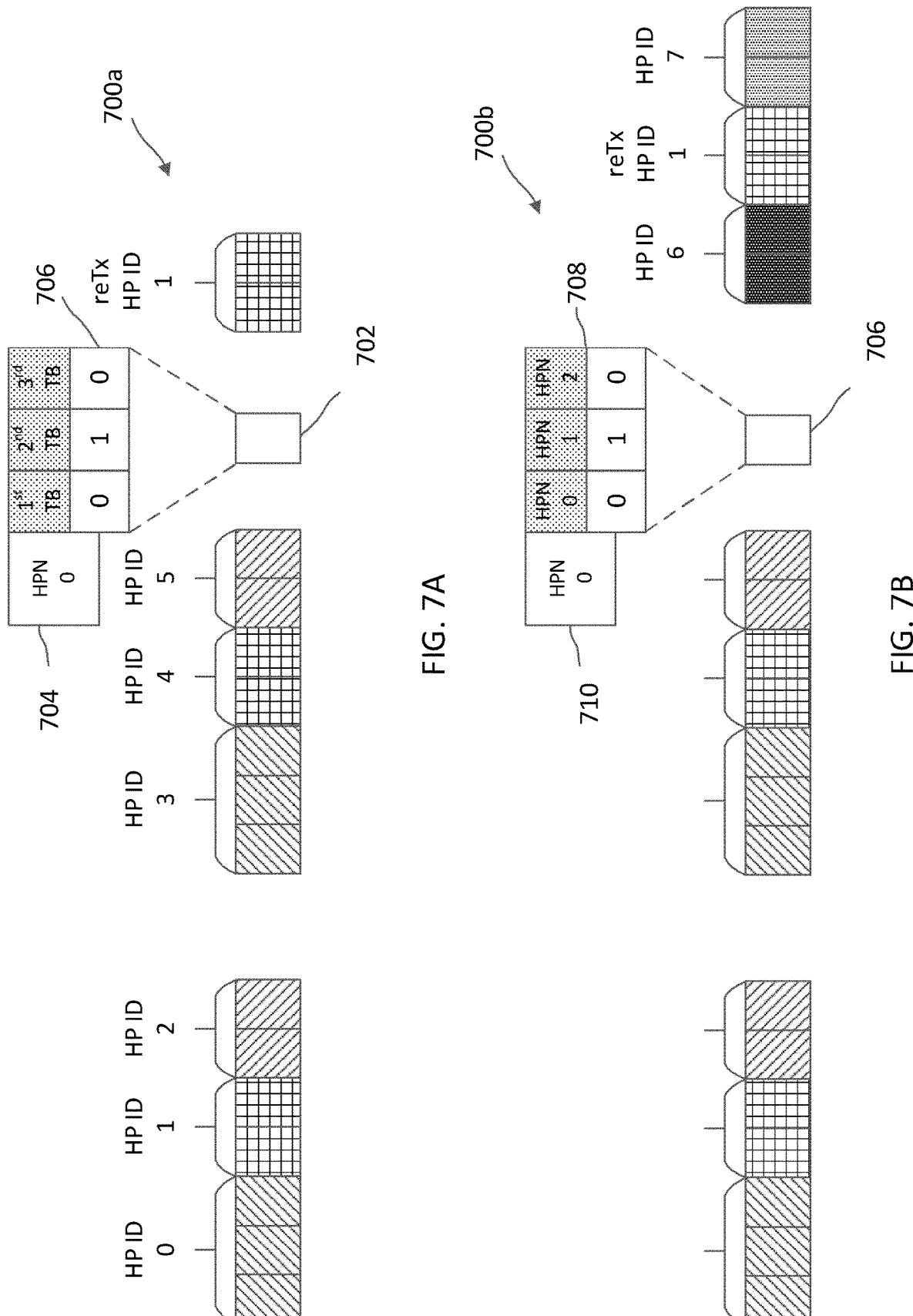
FIG. 7A illustrates a method for requesting and performing a TB retransmission, according to some aspects of the present disclosure.
FIG. 7B illustrates a method for requesting and performing a TB retransmission, according to some aspects of the present disclosure.

FIG. 7A illustrates a method 700a for requesting and performing a TB retransmission, according to some aspects of the present disclosure. In the scheme 700a, the BS transmits, to the UE, a retransmission request in a PDCCH 702 which is scrambled by CS-RNTI with NDI=1. The retransmission request includes a HARQ process ID field 704 and a bitmap 706. The HARQ process ID field 704 (shown as HPN in FIG. 7A) indicates the first HARQ process ID in the UL communication, and each bit of the bitmap indicates whether retransmission is requested for a corresponding TB index. The first bit in the bitmap, which is the 0 shown below "1$^{st}$ TB", corresponds to a first TB in the one or more TBs, starting with the TB associated with the first HARQ process in the HARQ process ID field 704. The sequence of TBs indicated by the bitmap may follow same order as the TB were transmitted by the UE. That is, if the HARQ process ID field 704 indicates 0, the first bit in the bitmap 706 corresponds to the TB with HP ID 0, the second bit in the bitmap 706 corresponds to the TB with HP ID 1, and so on. Accordingly, the UE can determine, based on the HARQ process ID field 704 and the bitmap 706, which of the TBs to retransmit. Because the bitmap 706 indicates that the second TB is to be retransmitted (i.e. second bit is 1), the UE retransmits the second TB, which has a HARQ process ID of 1 (HP ID 1).

According to another aspect, action 610 may include the BS 105 transmitting the retransmission request in a PDCCH scrambled by C-RNTI or CS-RNTI using a DCI format 0_1 for multi-PUSCH grants. The HARQ process IDs of the TBs for which the BS 105 requests transmission may be signaled in the DCI to indicate the first HARQ process in UL communication transmitted at action 604. In some aspects, the retransmission request includes a TDRA table that can indicate multiple PUSCHs in any slot of the scheduled slots. In some aspects, different rows of the TDRA table may have a different number of PUSCHs. For example, a row in the TDRA table may be in the form of {(SLIV1, mapping1), (SLIV2, mapping2), . . . }. The retransmission request may further include a NDI field having N bits, where each bit indicates whether a retransmission is requested, or a transmission of a new TB is requested. In other aspects, the retransmission request may include a redundancy version (RV) field having N bits. For example, the RV field may have 0 or 2 bits, in some aspects. The RV may indicate which RV versions of code bits for the TB is to be transmitted for the retransmission. In some aspects, the retransmission request may be included in a DCI, which includes a bitmap and an indication of a first HARQ process ID associated with a first bit in the bitmap. Each bit of the bitmap may indicate whether retransmission is requested for a corresponding HARQ process ID according to a scheduled order beginning with the first HARQ process ID.

FIG. 7B illustrates a method 700b for requesting and performing a TB retransmission, according to some aspects of the present disclosure. In the scheme 700b, the BS transmits, to the UE, a retransmission request in a PDCCH 702 which may be scrambled by C-RNTI or CS-RNTI. In some aspects, the BS transmits, in the PDCCH 702, a DCI format 0_1. The DCI may include a bitmap 708 and HARQ process ID field 710, which indicates a first HARQ process ID associated with a first bit in the bitmap. Each bit in the bitmap indicates whether retransmission is requested for a corresponding HARQ process ID according to a scheduled order beginning with the first HARQ process ID. In the scheme 700b, the BS may schedule a retransmission of a TB back-to-back with new TB transmissions. In this regard, the BS schedules, using the bitmap 708, a retransmission of the second TB (HP ID 1), back-to-back or contiguous with new transmissions of a TB having an HARQ process ID of 6, and a TB having a HARQ process ID of 7.

Referring again to FIG. 6, at action 612, the UE 115 retransmits the TB(s) indicated in the retransmission request to the BS 105. In some aspects, action 612 may include transmitting a single TB per slot, or multiple TBs per slot. In some aspects, action 612 includes transmitting a UL communication that includes a retransmitted TB and one or more new TBs. The retransmitted TB may be transmitted back-to-back with the new TBs, as explained above.

Figure 8:
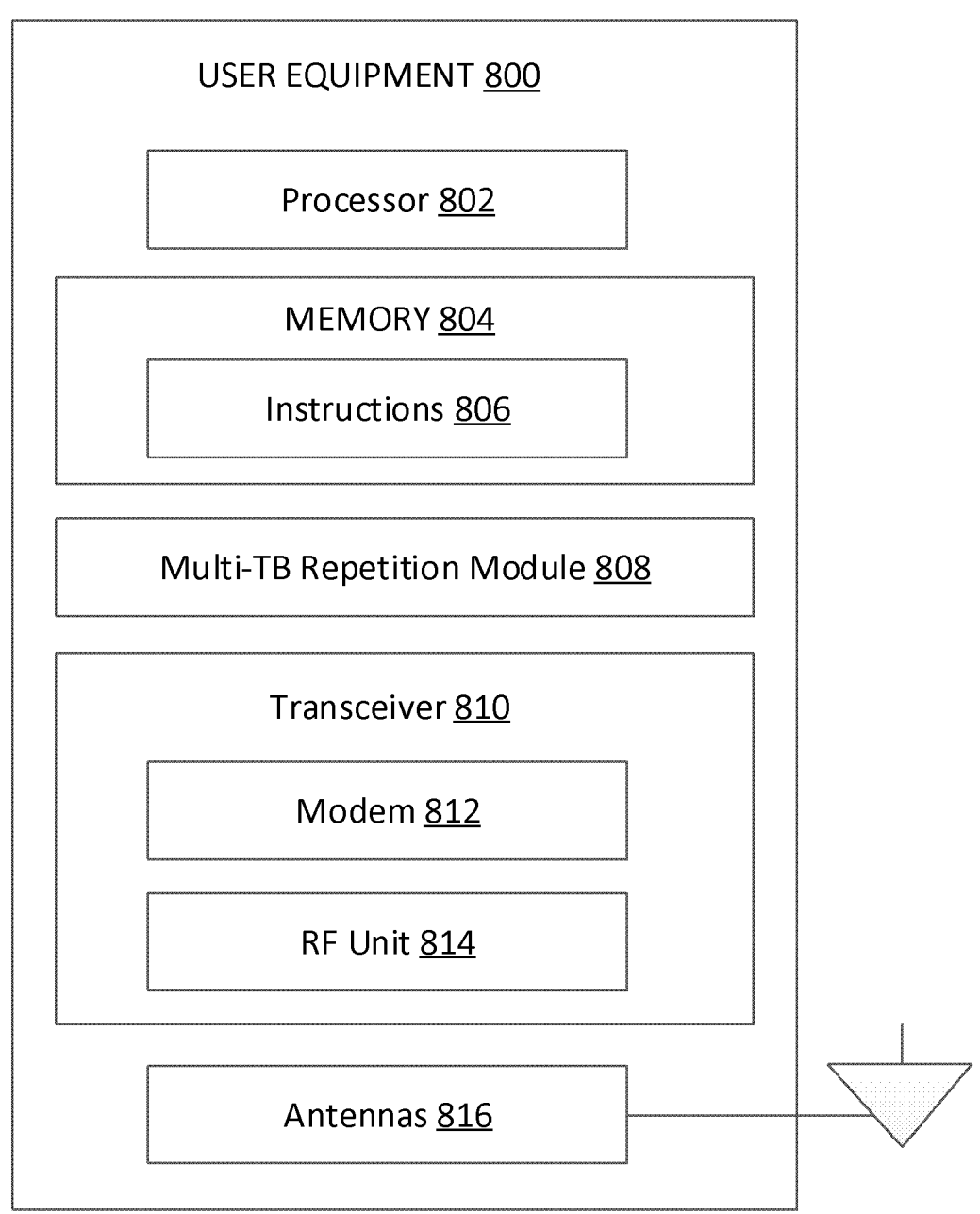
FIG. 8 is a block diagram of a user equipment (UE) according to some aspects of the present disclosure.

FIG. 8 is a block diagram of an exemplary UE 800 according to some aspects of the present disclosure. The UE 800 may be a UE 115 discussed above in FIG. 1. As shown, the UE 800 may include a processor 802, a memory 804, a Multi-TB Repetition Module 808, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 in connection with aspects of the present disclosure, for example, aspects of FIGS. 2-7B. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The Multi-TB Repetition Module 808 may be implemented via hardware, software, or combinations thereof. For example, Multi-TB Repetition Module 808 may be implemented as a processor, circuit, and/or instructions 806 stored in the memory 804 and executed by the processor 802. In some examples, the Multi-TB Repetition Module 808 can be integrated within the modem subsystem 812. For example, the Multi-TB Repetition Module 808 can be implemented by a combination of software components (e.g., executed by a DSP or a general processor) and hardware components (e.g., logic gates and circuitry) within the modem subsystem 812. In some examples, a UE may include one or more Multi-TB Repetition Module 808.

The Multi-TB Repetition Module 808 may be used for various aspects of the present disclosure, for example, aspects of FIGS. 1-7B. In some aspects, the Multi-TB Repetition Module 808 can be configured to a processor configured to: determine, based on a first parameter and a second parameter, a number of transport blocks (TBs) for a multi-TB repetition uplink (UL) communication in a configured grant (CG) resource, wherein the first parameter indicates a first number of TB repetitions, and wherein the second parameter indicates a second number of TB repetitions. The Multi-TB Repetition Module 808 may be further configured to cause the transceiver 810 to transmit, to a base station (BS) using the CG resource in an unlicensed band, a plurality of TB repetitions based on the determined number of TBs. In some aspects, the plurality of TB repetitions includes: a first group of TB repetitions associated with a first TB, and a second group of TB repetitions associated with a second TB different from the first TB, wherein the second group of TB repetitions is contiguous with the first group of TB repetitions.

In some aspects, the Multi-TB Repetition Module 808 is configured to apply a floor operation to a ratio of the first parameter to the second parameter. In other aspects, the Multi-TB Repetition Module 808 is configured to apply a ceiling operation to a ratio of the first parameter to the second parameter. In some aspects, the Multi-TB Repetition Module 808 is configured to determine an error condition based on a third number of TB repetitions associated with a second CG resource being lower than a fourth number of TB repetitions associated with the second CG resource. In some aspects, the Multi-TB Repetition Module 808 is configured to receive an activation for the second CG resource indicating at least the third number of TB repetitions.

In some aspects, the Multi-TB Repetition Module 808 is configured to cause the transceiver 810 to transmit, using a second CG resource, one or more TB repetitions associated with a single TB based on a third number of TB repetitions associated with the second CG resource being lower than a fourth number of TB repetitions associated with the second CG resource. In some aspects, the Multi-TB Repetition Module 808 is configured to cause the transceiver 810 to transmit the third number of TB repetitions based on a presence of an indication of the third number of TB repetitions in a configuration. In some aspects, the Multi-TB Repetition Module 808 is configured to cause the transceiver 810 to transmit the second number of TB repetitions. In some aspects, the Multi-TB Repetition Module 808 is configured to cause the transceiver 810 to transmit the second number of TB repetitions based on an absence of any indication of the third number of TB repetitions in a configuration. In some aspects, the Multi-TB Repetition Module 808 is configured to cause the transceiver 810 to transmit one or more nominal TB repetitions and one or more actual TB repetitions. In some aspects, the Multi-TB Repetition Module 808 is configured to cause the transceiver 810 to transmit a configured grant-uplink control information (CG-UCI) indicating a HARQ process identifier (ID) in each of the one or more actual TB repetitions. In some aspects, the Multi-TB Repetition Module 808 is configured to cause the transceiver 810 to transmit a configured grant-uplink control information (CG-UCI) indicating HARQ process identifier (ID) in each of the one or more nominal TB repetitions. In some aspects, the Multi-TB Repetition Module 808 is configured to cause the transceiver 810 to transmit the CG-UCI in a last actual repetition of the corresponding nominal TB repetition.

In some aspects, the Multi-TB Repetition Module 808 is configured to determine, for each of the plurality of TB repetitions, a hybrid automatic repeat request (HARQ) process identifier (ID) based on an equation of the form: HARQ process ID=(The first HARQ process ID+n) mod (nrof-HARQ-Processes), where n=1, . . . , N−1, wherein The first HARQ process ID is based on an equation of the form: The first HARQ process ID=$\{$[floor(CURRENT_symbol/periodicity)] mod [nrofHARQ-Processes/N]$\}$*N, wherein N is the number of TBs.

In some aspects, the Multi-TB Repetition Module 808 is configured to determine, for each of the plurality of TB repetitions, a hybrid automatic repeat request (HARQ) process identifier (ID) based on an equation of the form: HARQ process ID=(The first HARQ process ID−n) mod (nrof-HARQ-Processes), where n=1, . . . , N−1, and wherein the first HARQ process ID is based on an equation of the form: The first HARQ process ID=$\{$[floor(CURRENT_symbol/periodicity)] mod [ceil(nrofHARQ-Processes/N)]$\}$*N+i mod nrofHARQ-Processes, wherein i is based on an equation of the form: i=$\{$floor$\{$(CURRENT_symbol/periodicity)/[ceil(nrofHARQ-Processes/N)]$\}$ mod (NrofHARQ-Processes)$\}$*[N−(nrofHARQ-Processes) modulo N] if nrofHARQ-Processes) mod N is not equal to 0, otherwise i=0, and wherein N is the number of TBs.

In some aspects, the Multi-TB Repetition Module 808 is configured to cause the transceiver 810 to: receive a radio resource control (RRC) configuration. In some aspects, the Multi-TB Repetition Module 808 is further configured to determine the number of TBs based on the RRC configuration including a multi-TB repetition enabled configuration. In some aspects, the Multi-TB Repetition Module 808 is configured to cause the transceiver 810 to receive a radio resource control (RRC) configuration including a multi-TB repetition configuration. In some aspects, the Multi-TB Repetition Module 808 is further configured to determine the number of TBs based on the multi-TB repetition configuration including an enabled indication.

According to another aspect, the Multi-TB Repetition Module 808 is configured to cause the transceiver 810 to transmit, to a base station (BS) in a configured grant (CG) resource, a plurality of transport block (TB) repetitions associated with a plurality of TBs; receive, in a physical downlink control channel (PDCCH), a retransmission request indicating one or more TBs associated with the plurality of TB repetitions for retransmission; and transmit, to the BS, the one or more TBs. In some aspects, the Multi-TB Repetition Module 808 is configured to cause the transceiver 810 to transmit each of the one or more TBs based on a single uplink grant for each TB. In some aspects, the Multi-TB Repetition Module 808 is configured to cause the transceiver 810 to transmit multiple TBs of the one or more TBs based on single uplink grant for multiple TBs. In some aspects, the Multi-TB Repetition Module 808 is configured to cause the transceiver 810 to receive a downlink control information (DCI) comprising a bitmap and an indication of a HARQ process ID associated with a first bit in the bitmap, and wherein each bit of the bitmap indicates whether retransmission is requested for a corresponding TB index. In some aspects, the Multi-TB Repetition Module 808 is configured to cause the transceiver 810 to receive a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., configured grant UL transmissions, PUSCH) from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., configured grant information, parameters, bitmaps, other system and channel parameters, HARQ-ACK messages) to the Multi-TB Repetition Module 808 for processing. The antennas 816 may include multiple antennas of similar or different designs in order to sustain multiple transmission links. The RF unit 814 may configure the antennas 816. In an example, the transceiver 810 is configured to receive, from a base station (BS), information or parameters regarding a configured grant resource, and communicate, with the BS, PUSCHs and HARQ-ACKs associated with HARQ processes and HARQ process IDs, for example, by coordinating with the Multi-TB Repetition Module 808.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
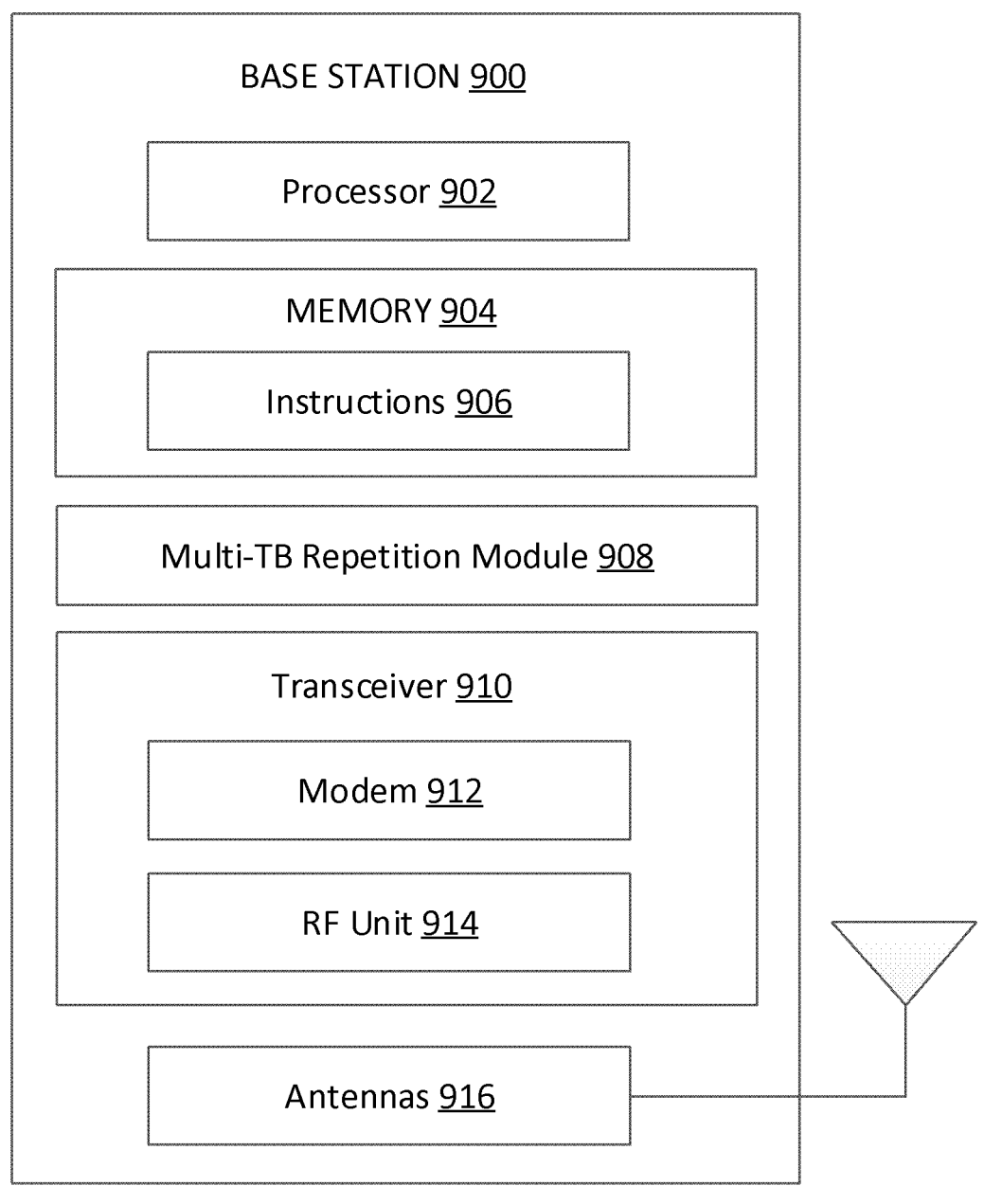
FIG. 9 is a block diagram of an exemplary base station (BS) according to some aspects of the present disclosure.

FIG. 9 is a block diagram of an exemplary BS 900 according to some aspects of the present disclosure. The BS 900 may be a BS 105 in the network 100 as discussed above in FIG. 1. A shown, the BS 900 may include a processor 902, a memory 904, Multi-TB Repetition Module 908, a transceiver 910 including a modem subsystem 912 and a RF unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM. PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 2-7B. Instructions 906 may also be referred to as code, which may be interpreted broadly to include any type of computer-readable statement(s).

The Multi-TB Repetition Module 908 may be implemented via hardware, software, or combinations thereof. For example, the Multi-TB Repetition Module 908 may be implemented as a processor, circuit, and/or instructions 906 stored in the memory 904 and executed by the processor 902. In some examples, the Multi-TB Repetition Module 908 can be integrated within the modem subsystem 912. For example, the Multi-TB Repetition Module 908 can be implemented by a combination of software components (e.g., executed by a DSP or a general processor) and hardware components (e.g., logic gates and circuitry) within the modem subsystem 912. In some examples, a UE may include one or more Multi-TB Repetition Module 908.

The Multi-TB Repetition Module 908 may be used for various aspects of the present disclosure, for example, aspects of FIGS. 1-7B. In some aspects, the Multi-TB Repetition Module 908 can be configured to cause the transceiver 910 to receive, from a user equipment (UE) in a configured grant (CG) resource, a communication signal associated with plurality of transport block (TB) repetitions associated with a plurality of TBs. The Multi-TB Repetition Module 908 may be further configured to generate, based on the communication signal, a retransmission request indicating one or more TBs associated with the plurality of TB repetitions for retransmission. The Multi-TB Repetition Module 908 may be further configured to cause the transceiver 910 to transmit, to the UE in a physical downlink control channel (PDCCH), the retransmission request.

In some aspects, the Multi-TB Repetition Module 908 is configured to generate a downlink control information (DCI) comprising a bitmap and an indication of a HARQ process ID associated with a first bit in the bitmap, and wherein each bit of the bitmap indicates whether retransmission is requested for a corresponding TB index. In some aspects, the Multi-TB Repetition Module 908 is configured to generate a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

As shown, the transceiver 910 may include the modem subsystem 912 and the RF unit 914. The transceiver 910 can be configured to communicate bi-directionally with other devices, such as the UEs 115 and/or 300 and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., configured grant information, parameters, bitmaps, other system and channel parameters, HARQ-ACK messages) from the modem subsystem 912 (on outbound transmissions) or of transmissions originating from another source such as a UE 115 and/or UE 300. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. This may include, for example, transmission of information to complete attachment to a network and communication with a camped UE 115 or 900 according to some aspects of the present disclosure. The antennas 916 may further receive data messages transmitted from other devices and provide the received data messages for processing and/or demodulation at the transceiver 910. The transceiver 910 may provide the demodulated and decoded data (e.g., configured grant UL transmissions, PUSCH) to the communication module 908 and configured transmission module 908 for processing. The antennas 916 may include multiple antennas of similar or different designs in order to sustain multiple transmission links. In an example, the transceiver 910 is configured to transmit, to a UE, information or parameters regarding a configured grant resource, and communicate, with the UE, PUSCHs and HARQ-ACKs associated with HARQ processes and HARQ process IDs, for example, by coordinating with the Multi-TB Repetition Module 908.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

FIG. 10 is a flow diagram of a communication method 1000 according to some aspects of the present disclosure. Steps of the method 1000 can be executed by a computing device (e.g., a processor, processing circuit, and/or other suitable component) of an apparatus or other suitable means for performing the steps. For example, a UE, such as UEs 115 and/or 800, may utilize one or more components, such as the processor 802, the memory 804, the Multi-TB Repetition Module 808, the transceiver 810, and the one or more antennas 816, to execute the steps of method 1000. The method 1000 may employ similar mechanisms as described above with respect to FIGS. 2-7B. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the UE determines, based on a first parameter and a second parameter, a number of transport blocks (TBs) for a multi-TB repetition uplink (UL) communication in a configured grant (CG) resource, wherein the first parameter indicates a first number of TB repetitions, and wherein the second parameter indicates a second number of TB repetitions. In some aspects, the UE determines the number of TBs by applying a floor operation to a ratio of the first parameter to the second parameter. In some aspects, the UE determines the number of TBs by applying a ceiling operation to a ratio of the first parameter to the second parameter.

At block 1020, the UE transmits, to a base station (BS) using the CG resource in an unlicensed band, a plurality of TB repetitions based on the determined number of TBs. In some aspects, the plurality of TB repetitions includes a first group of TB repetitions associated with a first TB, and a second group of TB repetitions associated with a second TB different from the first TB, wherein the second group of TB repetitions is contiguous with the first group of TB repetitions.

In some aspects, the method 1000 further includes the UE determining an error condition based on a third number of TB repetitions associated with a second CG resource being lower than a fourth number of TB repetitions associated with the second CG resource. In some aspects, the method 1000 further includes the UE receiving an activation for the second CG resource indicating at least the third number of TB repetitions. In some aspects, the method 1000 further includes the UE transmitting, using a second CG resource, one or more TB repetitions associated with a single TB based on a third number of TB repetitions associated with the second CG resource being lower than a fourth number of TB repetitions associated with the second CG resource. In some aspects, the transmitting the one or more repetitions associated with the single TB includes the UE transmitting the third number of TB repetitions based on a presence of an indication of the third number of TB repetitions in a configuration. In some aspects, the transmitting the one or more repetitions associated with the single TB includes the UE transmitting the second number of TB repetitions. In some aspects, the transmitting the second number of TB repetitions for the single TB is further based on an absence of any indication of the third number of TB repetitions in a configuration. In some aspects, the transmitting the plurality of TB repetitions includes the UE transmitting one or more nominal TB repetitions and one or more actual TB repetitions. In some aspects, the transmitting the plurality of TB repetitions includes the UE transmitting a configured grant-uplink control information (CG-UCI) indicating a HARQ process identifier (ID) in each of the one or more actual TB repetitions. In some aspects, the transmitting the plurality of TB repetitions includes the UE transmitting a configured grant-uplink control information (CG-UCI) indicating HARQ process identifier (ID) in each of the one or more nominal TB repetitions. In some aspects, the transmitting in each of the one or more nominal TB repetitions includes the UE transmitting the CG-UCI in a last actual repetition of the corresponding nominal TB repetition.

In some aspects, the method 1000 further includes the UE determining, for each of the plurality of TB repetitions, a hybrid automatic repeat request (HARQ) process identifier (ID) based on an equation of the form: HARQ process ID=(The first HARQ process ID+n) mod (nrofHARQ-Processes), where n=1, . . . , N−1, wherein The first HARQ process ID is based on an equation of the form: The first HARQ process ID={[floor(CURRENT_symbol/periodicity)] mod [nrofHARQ-Processes/N]}*N, wherein N is the number of TBs. In some aspects, the method 1000 further includes the UE determining, for each of the plurality of TB repetitions, a hybrid automatic repeat request (HARQ) process identifier (ID) based on an equation of the form: HARQ process ID=(The first HARQ process ID+n) mod (nrof-HARQ-Processes), where n=1, . . . , N−1, and wherein the first HARQ process ID is based on an equation of the form: The first HARQ process ID={[floor(CURRENT_symbol/periodicity)] mod [ceil(nrofHARQ-Processes/N)]}*N+i mod nrofHARQ-Processes, wherein i is based on an equation of the form: i={floor{(CURRENT_symbol/periodicity)/[ceil(nrofHARQ-Processes/N)]} mod (NrofHARQ-Processes)}*[N−(nrofHARQ-Processes) modulo N] if nrofHARQ-Processes) mod N is not equal to 0, otherwise i=0, and wherein N is the number of TBs.

Figure 11:
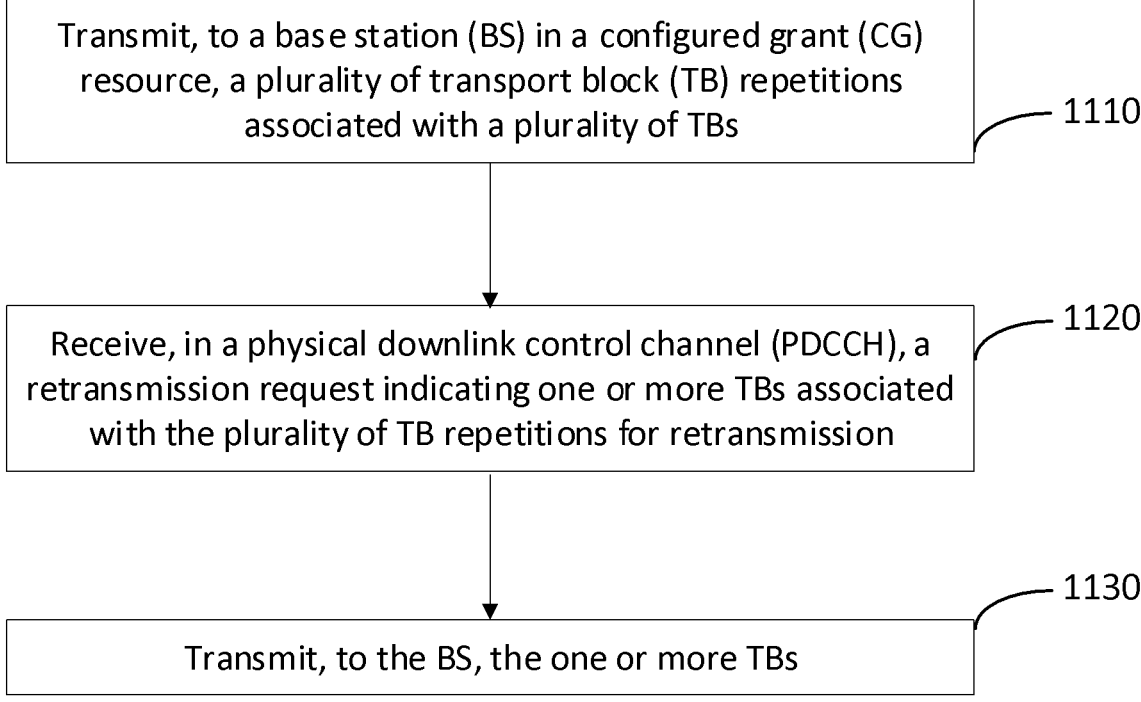
FIG. 11 is a flow diagram of a communication method according to some aspects of the present disclosure.

In some aspects, the method 1000 further includes the UE receiving a radio resource control (RRC) configuration; and determining the number of TBs based on the RRC configuration including a multi-TB repetition enabled configuration FIG. 11 is a flow diagram of a communication method 1100 according to some aspects of the present disclosure. Steps of the method 1100 can be executed by a computing device (e.g., a processor, processing circuit, and/or other suitable component) of an apparatus or other suitable means for performing the steps. For example, a UE, such as the UEs 115 and/or 800, may utilize one or more components, such as the processor 802, the memory 804, the Multi-TB Repetition Module 808, the transceiver 810, and the one or more antennas 816, to execute the steps of method 1100. The method 1100 may employ similar mechanisms as described above with respect to FIGS. 6-7B. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, the UE transmits, to a base station (BS) in a configured grant (CG) resource, a plurality of transport block (TB) repetitions associated with a plurality of TBs. The UE may utilize one or more components, such as the processor 802, the memory 804, the Multi-TB Repetition Module 808, the transceiver 810, and the one or more antennas 816, to execute the actions of block 1110.

At block 1120, the UE receives, in a physical downlink control channel (PDCCH), a retransmission request indicating one or more TBs associated with the plurality of TB repetitions for retransmission. In some aspects, block 1120 includes the UE receiving a downlink control information (DCI) comprising a bitmap and an indication of a HARQ process ID associated with a first bit in the bitmap, and wherein each bit of the bitmap indicates whether retransmission is requested for a corresponding TB index. In some aspects, block 1120 includes the UE receiving a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID. The UE may utilize one or more components, such as the processor 802, the memory 804, the Multi-TB Repetition Module 808, the transceiver 810, and the one or more antennas 816, to execute the actions of block 1120.

At block 1130, the UE transmits, to the BS, the one or more TBs. In some aspects, block 1130 includes the UE transmitting each of the one or more TBs based on a single uplink grant for each TB. In other aspects, block 1130 includes the UE transmitting multiple TBs of the one or more TBs based on single uplink grant for multiple TBs. The UE may utilize one or more components, such as the processor 802, the memory 804, the Multi-TB Repetition Module 808, the transceiver 810, and the one or more antennas 816, to execute the actions of block 1130.

FIG. 12 is a flow diagram of a communication method 1200 according to some aspects of the present disclosure. Steps of the method 1200 can be executed by a computing device (e.g., a processor, processing circuit, and/or other suitable component) of an apparatus or other suitable means for performing the steps. For example, a BS, such as the BSs 105 and/or 900, may utilize one or more components, such as the processor 902, the memory 904, the Multi-TB Repetition Module 908, the transceiver 910, and the one or more antennas 916, to execute the steps of method 1100. The method 1100 may employ similar mechanisms as described above with respect to FIGS. 2-7B. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1210, the BS receives, from a user equipment (UE) in a configured grant (CG) resource, a communication signal associated with plurality of transport block (TB) repetitions associated with a plurality of TBs. The BS may utilize one or more components, such as the processor 902, the memory 904, the Multi-TB Repetition Module 908, the transceiver 910, and the one or more antennas 916, to execute the actions of block 1210.

At block 1220, the BS generates, based on the communication signal, a retransmission request indicating one or more TBs associated with the plurality of TB repetitions for retransmission. In some aspects, block 1220 includes the BS generating a downlink control information (DCI) comprising a bitmap and an indication of a HARQ process ID associated with a first bit in the bitmap, and wherein each bit of the bitmap indicates whether retransmission is requested for a corresponding TB index. In some aspects, block 1220 includes the BS generating a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID. The BS may utilize one or more components, such as the processor 902, the memory 904, the Multi-TB Repetition Module 908, the transceiver 910, and the one or more antennas 916, to execute the actions of block 1220.

At block 1230, the BS transmits, to the UE in a physical downlink control channel (PDCCH), the retransmission request. The BS may utilize one or more components, such as the processor 902, the memory 904, the Multi-TB Repetition Module 908, the transceiver 910, and the one or more antennas 916, to execute the actions of block 1230.

Aspects of the present disclosure include the following:
1. A method for wireless communication using a user equipment (UE), the method comprising:
    determining, based on a first parameter and a second parameter, a number of transport blocks (TBs) for a multi-TB repetition uplink (UL) communication in a configured grant (CG) resource, wherein the first parameter indicates a first number of TB repetitions, and wherein the second parameter indicates a second number of TB repetitions; and transmitting, to a base station (BS) using the CG resource in an unlicensed band, a plurality of TB repetitions based on the determined number of TBs.

2. The method of clause 1, wherein the plurality of TB repetitions includes:
a first group of TB repetitions associated with a first TB, and
a second group of TB repetitions associated with a second TB different from the first TB, wherein the second group of TB repetitions is contiguous with the first group of TB repetitions.

3. The method of any of clauses 1-2, wherein the determining the number of TBs comprises applying a floor operation to a ratio of the first parameter to the second parameter.

4. The method of any of clauses 1-2, wherein the determining the number of TBs comprises applying a ceiling operation to a ratio of the first parameter to the second parameter.

5. The method of any of clauses 1-2, further comprising:
determining an error condition based on a third number of TB repetitions associated with a second CG resource being lower than a fourth number of TB repetitions associated with the second CG resource.

6. The method of clause 5, further comprising:
receiving an activation for the second CG resource indicating at least the third number of TB repetitions.

7. The method of any of clauses 1-6, further comprising:
transmitting, using a second CG resource, one or more TB repetitions associated with a single TB based on a third number of TB repetitions associated with the second CG resource being lower than a fourth number of TB repetitions associated with the second CG resource.

8 The method of clause 7, wherein the transmitting the one or more repetitions associated with the single TB comprises:
transmitting the third number of TB repetitions based on a presence of an indication of the third number of TB repetitions in a configuration.

9 The method of clause 7, wherein the transmitting the one or more repetitions associated with the single TB comprises:
transmitting the second number of TB repetitions.

10. The method of clause 9, wherein the transmitting the second number of TB repetitions for the single TB is further based on an absence of any indication of the third number of TB repetitions in a configuration.

11. The method of any of clauses 1-10, wherein the transmitting the plurality of TB repetitions comprises:
transmitting one or more nominal TB repetitions and one or more actual TB repetitions.

12. The method of clause 11, wherein the transmitting the plurality of TB repetitions comprises:
transmitting a configured grant-uplink control information (CG-UCI) indicating a HARQ process identifier (ID) in each of the one or more actual TB repetitions.

13. The method of clause 11, wherein the transmitting the plurality of TB repetitions comprises:
transmitting a configured grant-uplink control information (CG-UCI) indicating HARQ process identifier (ID) in each of the one or more nominal TB repetitions, wherein the transmitting in each of the one or more nominal TB repetitions comprises: transmitting the CG-UCI in a last actual repetition of the corresponding nominal TB repetition.

14. The method of any of clauses 1-13, further comprising:
determining, for each of the plurality of TB repetitions, a hybrid automatic repeat request (HARQ) process identifier (ID) based on an equation of the form:

HARQ process ID=(The first HARQ process ID+$n$) mod($n$rofHARQ-Processes), where $n$=1, . . . ,$N$–1, wherein The first HARQ process ID is based on an equation of the form:

The first HARQ process ID={[floor(CURRENT_symbol/periodicity)] mod [$n$rofHARQ-Processes/$N$]}*$N$, wherein N is the number of TBs.

15. The method of any of clauses 1-13, further comprising:
determining, for each of the plurality of TB repetitions, a hybrid automatic repeat request (HARQ) process identifier (ID) based on an equation of the form:

HARQ process ID=(The first HARQ process ID+$n$) mod($n$rofHARQ-Processes), where $n$=1, . . . ,$N$–1, and wherein the first HARQ process ID is based on an equation of the form:

The first HARQ process ID={[floor(CURRENT_symbol/periodicity)] mod [ceil($n$rofHARQ-Processes/$N$)]}*$N$+$i$ mod $n$rofHARQ-Processes, wherein i is based on an equation of the form:

$i$={floor{(CURRENT_symbol/periodicity)/[ceil($n$rofHARQ-Processes/$N$)]} mod($N$rofHARQ-Processes)}*[$N$–($n$rofHARQ-Processes)modulo $N$] if $n$rofHARQ-Processes)mod $N$ is not equal to 0, otherwise $i$=0, and wherein N is the number of TBs.

16. The method of any of clauses 1-15, further comprising:
receiving a radio resource control (RRC) configuration; and
determining the number of TBs based on the RRC configuration including a multi-TB repetition enabled configuration.

17. The method of any of clauses 1-15, further comprising:
receiving a radio resource control (RRC) configuration including a multi-TB repetition configuration; and
determining the number of TBs based on the multi-TB repetition configuration including an enabled indication.

18. A method for wireless communication using a user equipment (UE), comprising:
transmitting, to a base station (BS) in a configured grant (CG) resource, a plurality of transport block (TB) repetitions associated with a plurality of TBs;
receiving, in a physical downlink control channel (PDCCH), a retransmission request indicating one or more TBs associated with the plurality of TB repetitions for retransmission; and
transmitting, to the BS, the one or more TBs.

19. The method of clause 18, wherein the transmitting the one or more TBs comprises transmitting each of the one or more TBs based on a single uplink grant for each TB.

20. The method of clause 18, wherein the transmitting the one or more TBs comprises transmitting multiple TBs of the one or more TBs based on single uplink grant for multiple TBs.

21. The method of any of clauses 18-20, wherein the receiving the retransmission request comprises:
receiving a downlink control information (DCI) comprising a bitmap and an indication of a HARQ process ID associated with a first bit in the bitmap, and wherein each bit of the bitmap indicates whether retransmission is requested for a corresponding TB index.

22. The method of any of clauses 18-20, wherein the receiving the retransmission request comprises:
receiving a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

23. A method for wireless communication using a base station (BS), comprising:
receiving, from a user equipment (UE) in a configured grant (CG) resource, a communication signal associated with plurality of transport block (TB) repetitions associated with a plurality of TBs;
generating, based on the communication signal, a retransmission request indicating one or more TBs associated with the plurality of TB repetitions for retransmission; and
transmitting, to the UE in a physical downlink control channel (PDCCH), the retransmission request.

24. The method of clause 23, wherein the generating the retransmission request comprises:
generating a downlink control information (DCI) comprising a bitmap and an indication of a HARQ process ID associated with a first bit in the bitmap, and wherein each bit of the bitmap indicates whether retransmission is requested for a corresponding TB index.

25. The method of clause 23, wherein the generating the retransmission request comprises:
generating a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

Aspects of the present disclosure further include:

1. A method for wireless communication using a user equipment (UE), the method comprising:
determining, based on a first parameter and a second parameter, a number of transport blocks (TBs) for a multi-TB repetition uplink (UL) communication in a configured grant (CG) resource, wherein the first parameter indicates a first number of TB repetitions, and wherein the second parameter indicates a second number of TB repetitions; and
transmitting, to a base station (BS) using the CG resource in an unlicensed band, a plurality of TB repetitions based on the determined number of TBs.

2. The method of clause 1, wherein the plurality of TB repetitions includes:
a first group of TB repetitions associated with a first TB, and
a second group of TB repetitions associated with a second TB different from the first TB, wherein the second group of TB repetitions is contiguous with the first group of TB repetitions.

3 The method of clause 1, wherein the determining the number of TBs comprises applying a floor operation to a ratio of the first parameter to the second parameter.

4 The method of clause 1, wherein the determining the number of TBs comprises applying a ceiling operation to a ratio of the first parameter to the second parameter.

5. The method of clause 1, further comprising:
determining an error condition based on a third number of TB repetitions associated with a second CG resource being lower than a fourth number of TB repetitions associated with the second CG resource.

6. The method of clause 5, further comprising:
receiving an activation for the second CG resource indicating at least the third number of TB repetitions.

7. The method of clause 1, further comprising:
transmitting, using a second CG resource, one or more TB repetitions associated with a single TB based on a third number of TB repetitions associated with the second CG resource being lower than a fourth number of TB repetitions associated with the second CG resource.

8. The method of clause 7, wherein the transmitting the one or more repetitions associated with the single TB comprises:
transmitting the third number of TB repetitions based on a presence of an indication of the third number of TB repetitions in a configuration.

9 The method of clause 7, wherein the transmitting the one or more repetitions associated with the single TB comprises:
transmitting the second number of TB repetitions.

10. The method of clause 9, wherein the transmitting the second number of TB repetitions for the single TB is further based on an absence of any indication of the third number of TB repetitions in a configuration.

11. The method of clause 1, wherein the transmitting the plurality of TB repetitions comprises:
transmitting one or more nominal TB repetitions and one or more actual TB repetitions.

12. The method of clause 11, wherein the transmitting the plurality of TB repetitions comprises:
transmitting a configured grant-uplink control information (CG-UCI) indicating a HARQ process identifier (ID) in each of the one or more actual TB repetitions.

13. The method of clause 11, wherein the transmitting the plurality of TB repetitions comprises:
transmitting a configured grant-uplink control information (CG-UCI) indicating HARQ process identifier (ID) in each of the one or more nominal TB repetitions,
wherein the transmitting in each of the one or more nominal TB repetitions comprises:
transmitting the CG-UCI in a last actual repetition of the corresponding nominal TB repetition.

14. The method of clause 1, further comprising:
determining, for each of the plurality of TB repetitions, a hybrid automatic repeat request (HARQ) process identifier (ID) based on an equation of the form:

$$\text{HARQ process ID} = (\text{The first HARQ process ID} + n) \bmod(nrof\text{HARQ-Processes}), \text{ where}$$
$$n = 1, \ldots, N-1,$$

wherein The first HARQ process ID is based on an equation of the form:

$$\text{The first HARQ process ID} = \{[\text{floor}(\text{CURRENT\_symbol}/\text{periodicity})] \bmod [nrof\text{HARQ-Processes}/N]\} * N,$$

wherein N is the number of TBs.

15. The method of clause 1, further comprising:

determining, for each of the plurality of TB repetitions, a hybrid automatic repeat request (HARQ) process identifier (ID) based on an equation of the form:

HARQ process ID=(The first HARQ process ID+$n$) mod($n$rofHARQ-Processes), where $n$=1, . . . ,$N$−1, and wherein the first HARQ process ID is based on an equation of the form:

The first HARQ process ID={[floor(CURRENT_symbol/periodicity)] mod [ceil(nrofHARQ-Processes/$N$)]}*$N$+$i$ mod $n$rofHARQ-Processes, wherein i is based on an equation of the form:

$i$={floor{(CURRENT_symbol/periodicity)/[ceil($n$rofHARQ-Processes/$N$)]} mod($N$rofHARQ-Processes)}*[$N$−($n$rofHARQ-Processes) modulo $N$] if $n$rofHARQ-Processes)mod $N$ is not equal to 0, otherwise $i$=0, and wherein N is the number of TBs.

16. The method of clause 1, further comprising:

receiving a radio resource control (RRC) configuration; and determining the number of TBs based on the RRC configuration including a multi-TB repetition enabled configuration.

17. The method of clause 1, further comprising:

receiving a radio resource control (RRC) configuration including a multi-TB repetition configuration; and determining the number of TBs based on the multi-TB repetition configuration including an enabled indication.

18. A method for wireless communication using a user equipment (UE), comprising:

transmitting, to a base station (BS) in a configured grant (CG) resource, a plurality of transport block (TB) repetitions associated with a plurality of TBs;

receiving, in a physical downlink control channel (PDCCH), a retransmission request indicating one or more TBs associated with the plurality of TB repetitions for retransmission; and transmitting, to the BS, the one or more TBs.

19. The method of clause 18, wherein the transmitting the one or more TBs comprises transmitting each of the one or more TBs based on a single uplink grant for each TB.

20. The method of clause 18, wherein the transmitting the one or more TBs comprises transmitting multiple TBs of the one or more TBs based on single uplink grant for multiple TBs.

21. The method of clause 18, wherein the receiving the retransmission request comprises:

receiving a downlink control information (DCI) comprising a bitmap and an indication of a HARQ process ID associated with a first bit in the bitmap, and wherein each bit of the bitmap indicates whether retransmission is requested for a corresponding TB index.

22. The method of clause 18, wherein the receiving the retransmission request comprises:

receiving a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

23. A method for wireless communication using a base station (BS), comprising:

receiving, from a user equipment (UE) in a configured grant (CG) resource, a communication signal associated with plurality of transport block (TB) repetitions associated with a plurality of TBs;

generating, based on the communication signal, a retransmission request indicating one or more TBs associated with the plurality of TB repetitions for retransmission; and transmitting, to the UE in a physical downlink control channel (PDCCH), the retransmission request.

24. The method of clause 23, wherein the generating the retransmission request comprises:

generating a downlink control information (DCI) comprising a bitmap and an indication of a HARQ process ID associated with a first bit in the bitmap, and wherein each bit of the bitmap indicates whether retransmission is requested for a corresponding TB index.

25. The method of clause 23, wherein the generating the retransmission request comprises:

generating a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

26. A user equipment (UE), comprising:

a processor configured to:

determine, based on a first parameter and a second parameter, a number of transport blocks (TBs) for a multi-TB repetition uplink (UL) communication in a configured grant (CG) resource, wherein the first parameter indicates a first number of TB repetitions, and wherein the second parameter indicates a second number of TB repetitions; and a transceiver coupled with the processor and configured to:

transmit, to a base station (BS) using the CG resource in an unlicensed band, a plurality of TB repetitions based on the determined number of TBs.

27. The UE of clause 26, wherein the plurality of TB repetitions includes:

a first group of TB repetitions associated with a first TB, and a second group of TB repetitions associated with a second TB different from the first TB, wherein the second group of TB repetitions is contiguous with the first group of TB repetitions.

28. The UE of clause 26, wherein the processor configured to determine the number of TBs comprises the processor configured to:

apply a floor operation to a ratio of the first parameter to the second parameter.

29. The UE of clause 26, wherein the processor configured to determine the number of TBs comprises the processor configured to:

apply a ceiling operation to a ratio of the first parameter to the second parameter.

30. The UE of clause 26, wherein the processor is further configured to:

determine an error condition based on a third number of TB repetitions associated with a second CG resource being lower than a fourth number of TB repetitions associated with the second CG resource.

31. The UE of clause 30, wherein the processor is further configured to:
receive an activation for the second CG resource indicating at least the third number of TB repetitions.

32. The UE of clause 26, wherein the transceiver is further configured to:
transmit, using a second CG resource, one or more TB repetitions associated with a single TB based on a third number of TB repetitions associated with the second CG resource being lower than a fourth number of TB repetitions associated with the second CG resource.

33. The UE of clause 32, wherein the transceiver configured to transmit the one or more repetitions associated with the single TB comprises the transceiver configured to:
transmit the third number of TB repetitions based on a presence of an indication of the third number of TB repetitions in a configuration.

34. The UE of clause 32, wherein the transceiver configured to transmit the one or more repetitions associated with the single TB comprises the transceiver configured to:
transmit the second number of TB repetitions.

35. The UE of clause 34, wherein the transceiver configured to transmit the second number of TB repetitions for the single TB comprises the transceiver configured to:
transmit the second number of TB repetitions based on an absence of any indication of the third number of TB repetitions in a configuration.

36. The UE of clause 26, wherein the transceiver configured to transmit the plurality of TB repetitions comprises the transceiver configured to:
transmit one or more nominal TB repetitions and one or more actual TB repetitions.

37. The UE of clause 36, wherein the transceiver configured to transmit the plurality of TB repetitions comprises the transceiver configured to:
transmit a configured grant-uplink control information (CG-UCI) indicating a HARQ process identifier (ID) in each of the one or more actual TB repetitions.

38. The UE of clause 36, wherein the transceiver configured to transmit the plurality of TB repetitions comprises the transceiver configured to:
transmit a configured grant-uplink control information (CG-UCI) indicating HARQ process identifier (ID) in each of the one or more nominal TB repetitions,
wherein the transceiver configured to transmit in each of the one or more nominal TB repetitions comprises the transceiver configured to:
transmit the CG-UCI in a last actual repetition of the corresponding nominal TB repetition.

39. The UE of clause 26, wherein the processor is further configured to:
determine, for each of the plurality of TB repetitions, a hybrid automatic repeat request (HARQ) process identifier (ID) based on an equation of the form:

HARQ process ID=(The first HARQ process ID+$n$) mod($nr$ofHARQ-Processes), where
$n$=1, . . . ,$N$–1, wherein The first HARQ process ID is based on an equation of the form:

The first HARQ process ID={[floor(CURRENT_symbol/periodicity)] mod [$nr$ofHARQ-Processes/$N$]}*$N$, wherein N is the number of TBs.

40. The UE of clause 26, wherein the processor is further configured to:
determine, for each of the plurality of TB repetitions, a hybrid automatic repeat request (HARQ) process identifier (ID) based on an equation of the form:

HARQ process ID=(The first HARQ process ID+$n$) mod($nr$ofHARQ-Processes), where
$n$=1, . . . ,$N$–1, and wherein the first HARQ process ID is based on an equation of the form:

The first HARQ process ID={[floor(CURRENT_symbol/periodicity)] mod [ceil($nr$ofHARQ-Processes/$N$)]}*$N$+$i$ mod $nr$ofHARQ-Processes, wherein i is based on an equation of the form:

$i$={floor{(CURRENT_symbol/periodicity)/[ceil($nr$ofHARQ-Processes/$N$)]} mod($Nr$ofHARQ-Processes)}*[$N$–($nr$ofHARQ-Processes)modulo $N$]
if $nr$ofHARQ-Processes)mod $N$ is not equal to 0, otherwise $i$=0, and wherein N is the number of TBs.

41. The UE of clause 26, wherein the transceiver is further configured to:
receive a radio resource control (RRC) configuration, and
wherein the processor is further configured to:
determine the number of TBs based on the RRC configuration including a multi-TB repetition enabled configuration.

42. The UE of clause 26, wherein the transceiver is further configured to:
receive a radio resource control (RRC) configuration including a multi-TB repetition configuration; and
wherein the processor is further configured to:
determine the number of TBs based on the multi-TB repetition configuration including an enabled indication.

43. A user equipment (UE), comprising:
a transceiver configured to:
transmit, to a base station (BS) in a configured grant (CG) resource, a plurality of transport block (TB) repetitions associated with a plurality of TBs;
receive, in a physical downlink control channel (PDCCH), a retransmission request indicating one or more TBs associated with the plurality of TB repetitions for retransmission; and
transmit, to the BS, the one or more TBs.

44. The UE of clause 43, wherein the transceiver configured to transmit the one or more TBs comprises the transceiver configured to:
transmit each of the one or more TBs based on a single uplink grant for each TB.

45. The UE of clause 43, wherein the transceiver configured to transmit the one or more TBs comprises the transceiver configured to:
transmit multiple TBs of the one or more TBs based on single uplink grant for multiple TBs.

46. The UE of clause 43, wherein the transceiver configured to receive the retransmission request comprises the transceiver configured to:
receive a downlink control information (DCI) comprising a bitmap and an indication of a HARQ process ID associated with a first bit in the bitmap, and wherein each bit of the bitmap indicates whether retransmission is requested for a corresponding TB index.

47. The UE of clause 43, wherein the transceiver configured to receive the retransmission request comprises the transceiver configured to:

receive a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

48. A base station (BS), comprising:

a transceiver configured to:

receive, from a user equipment (UE) in a configured grant (CG) resource, a communication signal associated with plurality of transport block (TB) repetitions associated with a plurality of TBs; and a processor configured to:

generate, based on the communication signal, a retransmission request indicating one or more TBs associated with the plurality of TB repetitions for retransmission, wherein the transceiver is further configured to:

transmit, to the UE in a physical downlink control channel (PDCCH), the retransmission request.

49. The BS of clause 48, wherein the processor configured to generate the retransmission request comprises the processor configured to:

generate a downlink control information (DCI) comprising a bitmap and an indication of a HARQ process ID associated with a first bit in the bitmap, and wherein each bit of the bitmap indicates whether retransmission is requested for a corresponding TB index.

50. The BS of clause 48, wherein the processor configured to generate the retransmission request comprises the processor configured to:

generate a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

51. A non-transitory computer readable medium having program code recorded thereon, wherein the program code comprises:

code for causing a user equipment (UE) to determine, based on a first parameter and a second parameter, a number of transport blocks (TBs) for a multi-TB repetition uplink (UL) communication in a configured grant (CG) resource, wherein the first parameter indicates a first number of TB repetitions, and wherein the second parameter indicates a second number of TB repetitions; and code for causing the UE to transmit, to a base station (BS) using the CG resource in an unlicensed band, a plurality of TB repetitions based on the determined number of TBs.

52. The non-transitory computer readable medium of clause 51, wherein the plurality of TB repetitions includes:

a first group of TB repetitions associated with a first TB, and a second group of TB repetitions associated with a second TB different from the first TB, wherein the second group of TB repetitions is contiguous with the first group of TB repetitions.

53. The non-transitory computer readable medium of clause 51, wherein the code for causing the UE to determine the number of TBs comprises:

code for causing the UE to apply a floor operation to a ratio of the first parameter to the second parameter.

54. The non-transitory computer readable medium of clause 51, wherein the code for causing the UE to determine the number of TBs comprises:

code for causing the UE to apply a ceiling operation to a ratio of the first parameter to the second parameter.

55. The non-transitory computer readable medium of clause 51, wherein the program code further comprises:

code for causing the UE to determine an error condition based on a third number of TB repetitions associated with a second CG resource being lower than a fourth number of TB repetitions associated with the second CG resource.

56. The non-transitory computer readable medium of clause 55, wherein the program code further comprises:

code for causing the UE to receive an activation for the second CG resource indicating at least the third number of TB repetitions.

57. The non-transitory computer readable medium of clause 51, wherein the program code further comprises:

code for causing the UE to transmit, using a second CG resource, one or more TB repetitions associated with a single TB based on a third number of TB repetitions associated with the second CG resource being lower than a fourth number of TB repetitions associated with the second CG resource.

58. The non-transitory computer readable medium of clause 57, wherein the code for causing the UE to transmit the one or more repetitions associated with the single TB comprises:

code for causing the UE to transmit the third number of TB repetitions based on a presence of an indication of the third number of TB repetitions in a configuration.

59. The non-transitory computer readable medium of clause 57, wherein the code for causing the UE to transmit the one or more repetitions associated with the single TB comprises:

code for causing the UE to transmit the second number of TB repetitions.

60. The non-transitory computer readable medium of clause 59, wherein the code for causing the UE to transmit the second number of TB repetitions for the single TB comprises:

code for causing the UE to transmit the second number of TB repetitions based on an absence of any indication of the third number of TB repetitions in a configuration.

61. The non-transitory computer readable medium of clause 51, wherein the code for causing the UE to transmit the plurality of TB repetitions comprises:

code for causing the UE to transmit one or more nominal TB repetitions and one or more actual TB repetitions.

62. The non-transitory computer readable medium of clause 61, wherein the code for causing the UE to transmit the plurality of TB repetitions comprises:

code for causing the UE to transmit a configured grant-uplink control information (CG-UCI) indicating a HARQ process identifier (ID) in each of the one or more actual TB repetitions.

63. The non-transitory computer readable medium of clause 61, wherein the code for causing the UE to transmit the plurality of TB repetitions comprises:

code for causing the UE to transmit a configured grant-uplink control information (CG-UCI) indicating HARQ process identifier (ID) in each of the one or more nominal TB repetitions, wherein the code for causing the UE to transmit in each of the one or more nominal TB repetitions comprises:

code for causing the UE to transmit the CG-UCI in a last actual repetition of the corresponding nominal TB repetition.

64. The non-transitory computer readable medium of clause 51, wherein the program code further comprises:

code for causing the UE to determine, for each of the plurality of TB repetitions, a hybrid automatic repeat request (HARQ) process identifier (ID) based on an equation of the form:

HARQ process ID=(The first HARQ process ID+$n$) mod($nrof$HARQ-Processes), where $n$=1, . . . ,$N$–1, wherein The first HARQ process ID is based on an equation of the form:

The first HARQ process ID={[floor(CURRENT_symbol/periodicity)] mod [$nrof$HARQ-Processes/ $N$]}*$N$, wherein N is the number of TBs.

65. The non-transitory computer readable medium of clause 51, wherein the program code further comprises:

code for causing the UE to determine, for each of the plurality of TB repetitions, a hybrid automatic repeat request (HARQ) process identifier (ID) based on an equation of the form:

HARQ process ID=(The first HARQ process ID+$n$) mod($nrof$HARQ-Processes), where $n$=1, . . . ,$N$–1, and wherein the first HARQ process ID is based on an equation of the form:

The first HARQ process ID={[floor(CURRENT_symbol/periodicity)] mod [ceil($nrof$HARQ-Processes/$N$)]}*$N$+$i$ mod $nrof$HARQ-Processes, wherein i is based on an equation of the form:

$i$={floor{(CURRENT_symbol/periodicity)/[ceil($nrof$HARQ-Processes/$N$)]} mod($Nrof$HARQ-Processes)}*[$N$–($nrof$HARQ-Processes) modulo N] if $nrof$HARQ-Processes)mod N is not equal to 0, otherwise i=0, and wherein N is the number of TBs.

66. The non-transitory computer readable medium of clause 51, wherein the program code further comprises:

code for causing the UE to receiving a radio resource control (RRC) configuration, and code for causing the UE to determine the number of TBs based on the RRC configuration including a multi-TB repetition enabled configuration.

67. The non-transitory computer readable medium of clause 51, wherein the program code further comprises:

code for causing the UE to receive a radio resource control (RRC) configuration including a multi-TB repetition configuration; and code for causing the UE to determine the number of TBs based on the multi-TB repetition configuration including an enabled indication.

68. A non-transitory computer-readable medium having program code recorded thereon, wherein the program code comprises:

code for causing a user equipment (UE) to transmit, to a base station (BS) in a configured grant (CG) resource, a plurality of transport block (TB) repetitions associated with a plurality of TBs;

code for causing the UE to receive, in a physical downlink control channel (PDCCH), a retransmission request indicating one or more TBs associated with the plurality of TB repetitions for retransmission; and code for causing the UE to transmit, to the BS, the one or more TBs.

69. The non-transitory computer-readable medium of clause 68, wherein the code for causing the UE to transmit the one or more TBs comprises:

code for causing the UE to transmit each of the one or more TBs based on a single uplink grant for each TB.

70. The non-transitory computer-readable medium of clause 68, wherein the code for causing the UE to transmit the one or more TBs comprises:

code for causing the UE to transmit multiple TBs of the one or more TBs based on single uplink grant for multiple TBs.

71. The non-transitory computer-readable medium of clause 68, wherein the code for causing the UE to receive the retransmission request comprises:

code for causing the UE to receive a downlink control information (DCI) comprising a bitmap and an indication of a HARQ process ID associated with a first bit in the bitmap, and wherein each bit of the bitmap indicates whether retransmission is requested for a corresponding TB index.

72. The non-transitory computer-readable medium of clause 68, wherein the code for causing the UE to receive the retransmission request comprises:

code for causing the UE to receive a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

73. A non-transitory computer-readable medium having program code recorded thereon, wherein the program code comprises:

code for causing a base station (BS) to receive, from a user equipment (UE) in a configured grant (CG) resource, a communication signal associated with plurality of transport block (TB) repetitions associated with a plurality of TBs; and code for causing the BS to generate, based on the communication signal, a retransmission request indicating one or more TBs associated with the plurality of TB repetitions for retransmission, code for causing the BS to transmit, to the UE in a physical downlink control channel (PDCCH), the retransmission request.

74. The non-transitory computer-readable medium of clause 73, wherein the code for causing the BS to generate the retransmission request comprises:

code for causing the BS to generate a downlink control information (DCI) comprising a bitmap and an indication of a HARQ process ID associated with a first bit in the bitmap, and wherein each bit of the bitmap indicates whether retransmission is requested for a corresponding TB index.

75. The non-transitory computer-readable medium of clause 73, wherein the code for causing the BS to generate the retransmission request comprises:

code for causing the BS to generate a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

76. A user equipment (UE), comprising:

means for determining, based on a first parameter and a second parameter, a number of transport blocks (TBs) for a multi-TB repetition uplink (UL) communication in a configured grant (CG) resource, wherein the first parameter indicates a first number of TB repetitions, and wherein the second parameter indicates a second number of TB repetitions; and means for transmitting, to a base station (BS) using the CG resource in an unlicensed band, a plurality of TB repetitions based on the determined number of TBs.

77. The UE of clause 76, wherein the plurality of TB repetitions includes:

a first group of TB repetitions associated with a first TB, and a second group of TB repetitions associated with a second TB different from the first TB, wherein the second group of TB repetitions is contiguous with the first group of TB repetitions.

78. The UE of clause 76, wherein the means for determining the number of TBs comprises:

means for applying a floor operation to a ratio of the first parameter to the second parameter.

79. The UE of clause 76, wherein the means for determining the number of TBs comprises:

means for applying a ceiling operation to a ratio of the first parameter to the second parameter.

80. The UE of clause 76, further comprising:

means for determining an error condition based on a third number of TB repetitions associated with a second CG resource being lower than a fourth number of TB repetitions associated with the second CG resource.

81. The UE of clause 80, further comprising:

means for receiving an activation for the second CG resource indicating at least the third number of TB repetitions.

82. The UE of clause 76, further comprising:

means for transmitting, using a second CG resource, one or more TB repetitions associated with a single TB based on a third number of TB repetitions associated with the second CG resource being lower than a fourth number of TB repetitions associated with the second CG resource.

83. The UE of clause 82, wherein the means for transmitting the one or more repetitions associated with the single TB comprises:

means for transmitting the third number of TB repetitions based on a presence of an indication of the third number of TB repetitions in a configuration.

84. The UE of clause 82, wherein the means for transmitting the one or more repetitions associated with the single TB comprises:

means for transmitting the second number of TB repetitions.

85. The UE of clause 84, wherein the means for transmitting the second number of TB repetitions for the single TB comprises:

means for transmitting the second number of TB repetitions for the single TB based on an absence of any indication of the third number of TB repetitions in a configuration.

86. The UE of clause 76, wherein the means for transmitting the plurality of TB repetitions comprises:

means for transmitting one or more nominal TB repetitions and one or more actual TB repetitions.

87. The UE of clause 86, wherein the means for transmitting the plurality of TB repetitions comprises:

means for transmitting a configured grant-uplink control information (CG-UCI) indicating a HARQ process identifier (ID) in each of the one or more actual TB repetitions.

88. The UE of clause 86, wherein the means for transmitting the plurality of TB repetitions comprises:

means for transmitting a configured grant-uplink control information (CG-UCI) indicating HARQ process identifier (ID) in each of the one or more nominal TB repetitions, wherein the means for transmitting in each of the one or more nominal TB repetitions comprises:

means for transmitting the CG-UCI in a last actual repetition of the corresponding nominal TB repetition.

89. The UE of clause 76, further comprising:

means for determining, for each of the plurality of TB repetitions, a hybrid automatic repeat request (HARQ) process identifier (ID) based on an equation of the form:

HARQ process ID=(The first HARQ process ID+$n$) mod($n$rofHARQ-Processes), where $n$=1, . . . ,$N$−1, wherein The first HARQ process ID is based on an equation of the form:

The first HARQ process ID={[floor(CURRENT_symbol/periodicity)] mod [$n$rofHARQ-Processes/ $N$]}*$N$, wherein N is the number of TBs.

90. The UE of clause 76, further comprising:

means for determining, for each of the plurality of TB repetitions, a hybrid automatic repeat request (HARQ) process identifier (ID) based on an equation of the form:

HARQ process ID=(The first HARQ process ID+$n$) mod($n$rofHARQ-Processes), where $n$=1, . . . ,$N$−1, and wherein the first HARQ process ID is based on an equation of the form:

The first HARQ process ID={[floor(CURRENT_symbol/periodicity)] mod [ceil($n$rofHARQ-Processes/$N$)]}*$N$+$i$ mod $n$rofHARQ-Processes, wherein i is based on an equation of the form:

$i$={floor{(CURRENT_symbol/periodicity)/[ceil($n$rof-HARQ-Processes/$N$)]} mod($N$rofHARQ-Processes)}*[N–(nrofHARQ-Processes)modulo N]
if nrofHARQ-Processes)mod N is not equal to
0, otherwise i=0, and wherein N is the number of TBs.

91. The UE of clause 76, further comprising:
means for receiving a radio resource control (RRC) configuration; and
means for determining the number of TBs based on the RRC configuration including a multi-TB repetition enabled configuration.

92. The UE of clause 76, further comprising:
means for receiving a radio resource control (RRC) configuration including a multi-TB repetition configuration; and
means for determining the number of TBs based on the multi-TB repetition configuration including an enabled indication.

93. A user equipment (UE), comprising:
means for transmitting, to a base station (BS) in a configured grant (CG) resource, a plurality of transport block (TB) repetitions associated with a plurality of TBs;
means for receiving, in a physical downlink control channel (PDCCH), a retransmission request indicating one or more TBs associated with the plurality of TB repetitions for retransmission; and
means for transmitting, to the BS, the one or more TBs.

94. The UE of clause 93, wherein the means for transmitting the one or more TBs comprises:
means for transmitting each of the one or more TBs based on a single uplink grant for each TB.

95. The UE of clause 93, wherein the means for transmitting the one or more TBs comprises:
means for transmitting multiple TBs of the one or more TBs based on single uplink grant for multiple TBs.

96. The UE of clause 93, wherein the means for receiving the retransmission request comprises:
means for receiving a downlink control information (DCI) comprising a bitmap and an indication of a HARQ process ID associated with a first bit in the bitmap, and wherein each bit of the bitmap indicates whether retransmission is requested for a corresponding TB index.

97. The UE of clause 93, wherein the means for receiving the retransmission request comprises:
means for receiving a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

98. A base station (BS), comprising:
means for receiving, from a user equipment (UE) in a configured grant (CG) resource, a communication signal associated with plurality of transport block (TB) repetitions associated with a plurality of TBs;
means for generating, based on the communication signal, a retransmission request indicating one or more TBs associated with the plurality of TB repetitions for retransmission; and
means for transmitting, to the UE in a physical downlink control channel (PDCCH), the retransmission request.

99. The BS of clause 98, wherein the means for generating the retransmission request comprises:
means for generating a downlink control information (DCI) comprising a bitmap and an indication of a HARQ process ID associated with a first bit in the bitmap, and wherein each bit of the bitmap indicates whether retransmission is requested for a corresponding TB index.

100. The BS of clause 98, wherein the means for generating the retransmission request comprises:
means for generating a downlink control information (DCI) comprising a bitmap and an indication of a first HARQ process ID associated with a first bit in the bitmap, and wherein each bit of the bitmap indicates whether retransmission is requested for a corresponding HARQ process ID according to a scheduled order beginning with the first HARQ process ID.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication using a user equipment (UE), the method comprising:

determining, based on a first parameter and a second parameter, a number of transport blocks (TBs) for a multi-TB repetition uplink (UL) communication in a configured grant (CG) resource, wherein the first parameter indicates a number of TB repetitions signaled for transmission by a network entity, and wherein the second parameter indicates a number of TB repetitions actually transmitted by the UE, and wherein the number of TB repetitions actually transmitted by the UE is based on one or more TB repetitions signaled for transmission by the network entity being extended across a slot boundary; and transmitting, to the network entity using the CG resource in an unlicensed band, a plurality of TB repetitions based on the determined number of TBs.

2. The method of claim 1, wherein the plurality of TB repetitions includes:

a first group of TB repetitions associated with a first TB, and a second group of TB repetitions associated with a second TB different from the first TB, wherein the second group of TB repetitions is contiguous with the first group of TB repetitions.

3. The method of claim 1, wherein the determining the number of TBs comprises applying a floor operation to a ratio of the first parameter to the second parameter.

4. The method of claim 1, wherein the determining the number of TBs comprises applying a ceiling operation to a ratio of the first parameter to the second parameter.

5. The method of claim 1, further comprising:

determining an error condition based on a third number of TB repetitions associated with a second CG resource being lower than a fourth number of TB repetitions associated with the second CG resource.

6. The method of claim 5, further comprising:

receiving an activation for the second CG resource indicating at least the third number of TB repetitions.

7. The method of claim 1, further comprising:

transmitting, using a second CG resource, one or more TB repetitions associated with a single TB based on a third number of TB repetitions associated with the second CG resource being lower than a fourth number of TB repetitions associated with the second CG resource.

8. The method of claim 7, wherein the transmitting the one or more repetitions associated with the single TB comprises:

transmitting the third number of TB repetitions based on a presence of an indication of the third number of TB repetitions in a configuration.

9. The method of claim 7, wherein the transmitting the one or more repetitions associated with the single TB comprises:

transmitting the number of TB repetitions actually transmitted by the UE.

10. The method of claim 9, wherein the transmitting the number of TB repetitions actually transmitted by the UE is further based on an absence of any indication of the third number of TB repetitions in a configuration.

11. The method of claim 1, wherein the transmitting the plurality of TB repetitions comprises:

transmitting one or more nominal TB repetitions and one or more actual TB repetitions.

12. The method of claim 11, wherein the transmitting the plurality of TB repetitions comprises:

transmitting a configured grant-uplink control information (CG-UCI) indicating a HARQ process identifier (ID) in each of the one or more actual TB repetitions.

13. The method of claim 11, wherein the transmitting the plurality of TB repetitions comprises:

transmitting a configured grant-uplink control information (CG-UCI) indicating HARQ process identifier (ID) in each of the one or more nominal TB repetitions, wherein the transmitting in each of the one or more nominal TB repetitions comprises:

transmitting the CG-UCI in a last actual repetition of the corresponding nominal TB repetition.

14. A user equipment (UE), comprising:

one or more processors configured to:

determine, based on a first parameter and a second parameter, a number of transport blocks (TBs) for a multi-TB repetition uplink (UL) communication in a configured grant (CG) resource, wherein the first parameter indicates a number of TB repetitions signaled for transmission by a network entity, and wherein the second parameter indicates a number of TB repetitions actually transmitted by the UE, and wherein the number of TB repetitions actually transmitted by the UE is based on one or more TB repetitions signaled for transmission by the network entity being extended across a slot boundary; and a transceiver coupled with the one or more processors and configured to:

transmit, to the network entity using the CG resource in an unlicensed band, a plurality of TB repetitions based on the determined number of TBs.

15. The UE of claim 14, wherein the plurality of TB repetitions includes:

a first group of TB repetitions associated with a first TB, and a second group of TB repetitions associated with a second TB different from the first TB, wherein the second group of TB repetitions is contiguous with the first group of TB repetitions.

16. The UE of claim 14, wherein the one or more processors configured to determine the number of TBs comprises the one or more processors configured to:

apply a floor operation to a ratio of the first parameter to the second parameter.

17. The UE of claim 14, wherein the one or more processors configured to determine the number of TBs comprises the one or more processors configured to:

apply a ceiling operation to a ratio of the first parameter to the second parameter.

18. The UE of claim 14, wherein the one or more processors is further configured to:

determine an error condition based on a third number of TB repetitions associated with a second CG resource being lower than a fourth number of TB repetitions associated with the second CG resource.

19. The UE of claim 18, wherein the one or more processors is further configured to:

receive an activation for the second CG resource indicating at least the third number of TB repetitions.

20. The UE of claim 14, wherein the transceiver is further configured to:

transmit, using a second CG resource, one or more TB repetitions associated with a single TB based on a third number of TB repetitions associated with the second CG resource being lower than a fourth number of TB repetitions associated with the second CG resource.

21. The UE of claim 20, wherein the transceiver configured to transmit the one or more repetitions associated with the single TB comprises the transceiver configured to:

transmit the third number of TB repetitions based on a presence of an indication of the third number of TB repetitions in a configuration.

22. The UE of claim 20, wherein the transceiver configured to transmit the one or more repetitions associated with the single TB comprises the transceiver configured to:

transmit the number of TB repetitions actually transmitted by the UE.

23. The UE of claim 22, wherein the transceiver configured to transmit the number of TB repetitions actually transmitted by the UE comprises the transceiver configured to:

transmit the number of TB repetitions actually transmitted by the UE based on an absence of any indication of the third number of TB repetitions in a configuration.

24. The UE of claim 14, wherein the transceiver configured to transmit the plurality of TB repetitions comprises the transceiver configured to:

transmit one or more nominal TB repetitions and one or more actual TB repetitions.

25. The UE of claim 24, wherein the transceiver configured to transmit the plurality of TB repetitions comprises the transceiver configured to:

transmit a configured grant-uplink control information (CG-UCI) indicating a HARQ process identifier (ID) in each of the one or more actual TB repetitions.

26. The UE of claim 24, wherein the transceiver configured to transmit the plurality of TB repetitions comprises the transceiver configured to:

transmit a configured grant-uplink control information (CG-UCI) indicating HARQ process identifier (ID) in each of the one or more nominal TB repetitions, wherein the transceiver configured to transmit in each of the one or more nominal TB repetitions comprises the transceiver configured to:

transmit the CG-UCI in a last actual repetition of the corresponding nominal TB repetition.

27. A non-transitory computer readable medium having program code recorded thereon, wherein the program code comprises:

code for causing a user equipment (UE) to determine, based on a first parameter and a second parameter, a number of transport blocks (TBs) for a multi-TB repetition uplink (UL) communication in a configured grant (CG) resource, wherein the first parameter indicates a number of TB repetitions signaled for transmission by a network entity, and wherein the second parameter indicates a number of TB repetitions actually transmitted by the UE, and wherein the number of TB repetitions actually transmitted by the UE is based on one or more TB repetitions signaled for transmission by the network entity being extended across a slot boundary; and code for causing the UE to transmit, to the network entity using the CG resource in an unlicensed band, a plurality of TB repetitions based on the determined number of TBs.

28. A user equipment (UE), comprising:

means for determining, based on a first parameter and a second parameter, a number of transport blocks (TBs) for a multi-TB repetition uplink (UL) communication in a configured grant (CG) resource, wherein the first parameter indicates a number of TB repetitions signaled for transmission by a network entity, and wherein the second parameter indicates a number of TB repetitions actually transmitted by the UE, and wherein the number of TB repetitions actually transmitted by the UE is based on one or more TB repetitions signaled for transmission by the network entity being extended across a slot boundary; and means for transmitting, to the network entity using the CG resource in an unlicensed band, a plurality of TB repetitions based on the determined number of TBs.

29. The UE of claim 28, wherein the plurality of TB repetitions includes:

a first group of TB repetitions associated with a first TB, and a second group of TB repetitions associated with a second TB different from the first TB, wherein the second group of TB repetitions is contiguous with the first group of TB repetitions.

30. The UE of claim 28, wherein the means for determining the number of TBs comprises:

means for applying a floor operation to a ratio of the first parameter to the second parameter.

31. The UE of claim 28, wherein the means for determining the number of TBs comprises:

means for applying a ceiling operation to a ratio of the first parameter to the second parameter.

32. The UE of claim 28, further comprising:

means for determining an error condition based on a third number of TB repetitions associated with a second CG resource being lower than a fourth number of TB repetitions associated with the second CG resource.

33. The UE of claim 32, further comprising:

means for receiving an activation for the second CG resource indicating at least the third number of TB repetitions.

34. The UE of claim 28, further comprising:

means for transmitting, using a second CG resource, one or more TB repetitions associated with a single TB based on a third number of TB repetitions associated with the second CG resource being lower than a fourth number of TB repetitions associated with the second CG resource.

35. The UE of claim 34, wherein the means for transmitting the one or more repetitions associated with the single TB comprises:

means for transmitting the third number of TB repetitions based on a presence of an indication of the third number of TB repetitions in a configuration.

36. The UE of claim 34, wherein the means for transmitting the one or more repetitions associated with the single TB comprises:

means for transmitting the number of TB repetitions actually transmitted by the UE.

37. The UE of claim 36, wherein the means for transmitting the number of TB repetitions actually transmitted by the UE comprises:

means for transmitting the number of TB repetitions actually transmitted by the UE based on an absence of any indication of the third number of TB repetitions in a configuration.

38. The UE of claim 28, wherein the means for transmitting the plurality of TB repetitions comprises:

means for transmitting one or more nominal TB repetitions and one or more actual TB repetitions.

39. The UE of claim 38, wherein the means for transmitting the plurality of TB repetitions comprises:

means for transmitting a configured grant-uplink control information (CG-UCI) indicating a HARQ process identifier (ID) in each of the one or more actual TB repetitions.

40. The UE of claim 38, wherein the means for transmitting the plurality of TB repetitions comprises:

means for transmitting a configured grant-uplink control information (CG-UCI) indicating HARQ process identifier (ID) in each of the one or more nominal TB repetitions, wherein the means for transmitting in each of the one or more nominal TB repetitions comprises:

means for transmitting the CG-UCI in a last actual repetition of the corresponding nominal TB repetition.

* * * * *